United States Patent
Lee et al.

(10) Patent No.: US 9,883,186 B2
(45) Date of Patent: *Jan. 30, 2018

(54) METHOD AND APPARATUS FOR ENCODING/DECODING MOTION VECTOR

(71) Applicant: SAMSUNG ELECTRONICS CO., LTD., Suwon-si (KR)

(72) Inventors: Tammy Lee, Seoul (KR); Woo-jin Han, Suwon-si (KR); Kyo-hyuk Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/369,958

(22) Filed: Dec. 6, 2016

(65) Prior Publication Data

US 2017/0085882 A1    Mar. 23, 2017

Related U.S. Application Data

(63) Continuation of application No. 14/341,493, filed on Jul. 25, 2014, now Pat. No. 9,544,588, which is a
(Continued)

(30) Foreign Application Priority Data

Aug. 13, 2009    (KR) .................. 10-2009-0074896

(51) Int. Cl.
*H04N 19/139*    (2014.01)
*H04N 19/105*    (2014.01)
(Continued)

(52) U.S. Cl.
CPC ......... *H04N 19/139* (2014.11); *H04N 19/105* (2014.11); *H04N 19/117* (2014.11);
(Continued)

(58) Field of Classification Search
CPC combination set(s) only.
See application file for complete search history.

(56) References Cited

U.S. PATENT DOCUMENTS 6,971,373 B2    12/2005    Mudway et al.
7,469,070 B2    12/2008    Winger
(Continued)

FOREIGN PATENT DOCUMENTS

CA    2230567 A1    9/1998
CA    2 768 182 A1    2/2011
(Continued)

OTHER PUBLICATIONS

Communication dated May 18, 2016 issued by the Russian Patent Office in counterpart Russian Patent Application No. 2015120773/08.
(Continued)

*Primary Examiner* — Sath V Perungavoor
*Assistant Examiner* — Janese Duley
(74) *Attorney, Agent, or Firm* — Sughrue Mion, PLLC

(57) ABSTRACT

Provided are methods and apparatuses for encoding and decoding a motion vector including a method of decoding that includes obtaining a current coding unit hierarchically split from a maximum coding unit according to a current depth, obtaining a prediction mode information of a current prediction unit in the current coding unit from bitstream, when a prediction mode of the current prediction unit is inter-prediction mode, determining motion vector predictor candidates from among motion vectors of neighboring prediction units adjacent to the current prediction unit, and determining a motion vector predictor of the current prediction unit from among the motion vector predictor candidates, wherein the neighboring prediction unit comprises a first block directly to the left side of a leftmost block among
(Continued)

blocks located directly to a bottom side of the current prediction unit and a second block located directly to a upper side of the first block.

11 Claims, 13 Drawing Sheets

Related U.S. Application Data continuation of application No. 14/028,816, filed on Sep. 17, 2013, now Pat. No. 8,811,488, which is a continuation of application No. 12/856,197, filed on Aug. 13, 2010, now Pat. No. 8,537,897.

(51) Int. Cl.

| | |
|---|---|
| *H04N 19/52* | (2014.01) |
| *H04N 19/176* | (2014.01) |
| *H04N 19/70* | (2014.01) |
| *H04N 19/147* | (2014.01) |
| *H04N 19/513* | (2014.01) |
| *H04N 19/61* | (2014.01) |
| *H04N 19/96* | (2014.01) |
| *H04N 19/117* | (2014.01) |
| *H04N 19/124* | (2014.01) |
| *H04N 19/159* | (2014.01) |
| *H04N 19/86* | (2014.01) |
| *H04N 19/184* | (2014.01) |

(52) U.S. Cl.
CPC ......... *H04N 19/124* (2014.11); *H04N 19/147* (2014.11); *H04N 19/159* (2014.11); *H04N 19/176* (2014.11); *H04N 19/513* (2014.11); *H04N 19/52* (2014.11); *H04N 19/61* (2014.11); *H04N 19/70* (2014.11); *H04N 19/865* (2014.11); *H04N 19/96* (2014.11); *H04N 19/184* (2014.11)

(56) References Cited

U.S. PATENT DOCUMENTS

| | | | |
|---|---|---|---|
| 8,086,052 | B2 | 12/2011 | Toth et al. |
| 8,311,118 | B2 | 11/2012 | Lee et al. |
| 8,345,754 | B2 | 1/2013 | Ribas-Corbera et al. |
| 8,369,410 | B2 | 2/2013 | Lee et al. |
| 2002/0148445 | A1 | 10/2002 | Doane et al. |
| 2003/0099292 | A1 | 5/2003 | Wang et al. |
| 2004/0184542 | A1 | 9/2004 | Fujimoto |
| 2005/0013498 | A1 | 1/2005 | Srinivasan et al. |
| 2005/0053144 | A1 | 3/2005 | Holcomb |
| 2005/0100097 | A1 | 5/2005 | Yoo |
| 2005/0188958 | A1 | 9/2005 | Klenk et al. |
| 2005/0205065 | A1 | 9/2005 | Rembold et al. |
| 2006/0018381 | A1 | 1/2006 | Luo et al. |
| 2006/0146191 | A1* | 7/2006 | Kim ............... H04N 19/176 348/557 |
| 2006/0256851 | A1 | 11/2006 | Wang et al. |
| 2007/0014361 | A1 | 1/2007 | Cruz et al. |
| 2007/0058714 | A1 | 3/2007 | Noda |
| 2008/0043842 | A1 | 2/2008 | Nakaishi |
| 2008/0043843 | A1 | 2/2008 | Nakaishi |
| 2008/0082058 | A1 | 3/2008 | Wallach |
| 2008/0107180 | A1 | 5/2008 | Lee et al. |
| 2008/0117977 | A1 | 5/2008 | Lee et al. |
| 2008/0159401 | A1 | 7/2008 | Lee et al. |
| 2008/0192830 | A1 | 8/2008 | Ahn et al. |
| 2008/0240242 | A1 | 10/2008 | Lainema |
| 2009/0129472 | A1 | 5/2009 | Panusopone et al. |
| 2009/0136092 | A1 | 5/2009 | Springer et al. |
| 2010/0086028 | A1 | 4/2010 | Tanizawa et al. |
| 2010/0128995 | A1 | 5/2010 | Drugeon et al. |
| 2010/0208814 | A1 | 8/2010 | Xiong et al. |
| 2011/0280304 | A1 | 11/2011 | Jeon et al. |
| 2014/0334550 | A1 | 11/2014 | Lee et al. |
| 2015/0201195 | A1 | 7/2015 | Moriya et al. |

FOREIGN PATENT DOCUMENTS

| | | |
|---|---|---|
| CA | 2 820 901 A1 | 2/2011 |
| CN | 1585487 A | 2/2005 |
| CN | 1617595 A | 5/2005 |
| CN | 100456833 C | 1/2009 |
| CN | 101415122 A | 4/2009 |
| EP | 0551599 B1 | 7/1998 |
| EP | 1 098 529 A2 | 5/2001 |
| EP | 1 784 985 | 2/2006 |
| EP | 2 088 554 A2 | 8/2009 |
| EP | 2 202 985 A1 | 6/2010 |
| JP | 11-112994 A | 4/1999 |
| JP | 2004-241880 A | 8/2004 |
| JP | 2005-510985 A | 4/2005 |
| JP | 2007-006399 A | 1/2007 |
| JP | 2007-329258 A | 12/2007 |
| JP | 2007-329528 A | 12/2007 |
| JP | 2008-048289 A | 2/2008 |
| JP | 2008-283490 A | 11/2008 |
| JP | 2008-311781 A | 12/2008 |
| JP | 2011-501542 A | 1/2011 |
| JP | 2015-019420 A | 1/2015 |
| JP | 2015-029335 A | 2/2015 |
| KR | 10-2006-0027795 A | 3/2006 |
| KR | 10-2008-0064355 A | 7/2008 |
| KR | 10-2009-0002412 A | 1/2009 |
| RU | 2 204 217 C2 | 5/2003 |
| RU | 2005106280 A | 10/2005 |
| RU | 2360375 C2 | 6/2009 |
| TW | 200402662 A | 2/2004 |
| TW | 1272013 B | 1/2007 |
| TW | 1287927 B | 10/2007 |
| TW | 200850013 | 12/2008 |
| TW | 200922338 A | 5/2009 |
| WO | 2004052000 A2 | 6/2004 |
| WO | 2005/027496 A2 | 3/2005 |
| WO | 2006/012383 A2 | 2/2006 |
| WO | 2007/034918 A1 | 3/2007 |
| WO | 2008/082158 A1 | 7/2008 |
| WO | 2009/052742 A1 | 4/2009 |
| WO | 2010/039728 A2 | 4/2010 |

OTHER PUBLICATIONS

Communication dated May 30, 2016 issued by the Russian Patent Office in counterpart Russian Patent Application No. 2015120764/08.
Communication dated Jun. 27, 2016 issued by the State Intellectual Property Office of P.R. China in counterpart Chinese Patent Application No. 201310131990.8.
Communication dated Dec. 23, 2015, issued by the European Patent Office in counterpart European Application No. 15168128.5.
Communication dated Feb. 25, 2016, issued by the State Intellectual Property Office of P.R. China in counterpart Chinese Application No. 201510002248.6.
Communication dated Sep. 29, 2015, issued by the State Intellectual Property Office of P.R. China in counterpart Chinese Application No. 201310132005.5.
Communication dated Oct. 15, 2015, issued by the Intellectual Property Corporation of Malaysia in counterpart Malaysian Application No. PI 2013003048.
Communication dated Dec. 15, 2015, issued by the European Patent Office in counterpart European Application No. 15168128.5.
Ken McCann et al.m "Samsung and BBC response to Call for Proposals on Video Compression Technology", 1. JCT-VC Meeting; Apr. 15, 2010-Apr. 23, 2010; Dresden; (Jointcollaborative Team on Video Coding of ISO/IEC JTC1/SC29/WG11 and ITU-TSG.16); URL: Http://WFTP3.ITU.INT/AV-ARCH/JCTVC-SITE/,,Apr. 16, 2010, XP 030007574, Total 36 pages.
Ken McCann et al., "Samsung's Response to the Call for Proposals on Video Compression Technology", 1. JCT-VC Meeting; Apr. 15,

(56) References Cited

OTHER PUBLICATIONS

2010-Apr. 23, 2010; Dresden; (Jointcollaborative Team on Video Coding of ISO/IEC JTC1/SC29/WG11 and ITU-TSG.16); URL: Http://WFTP3.ITU.INT/AV-ARCH/JCTVC-SITE/,,No. JCTVC-A124, Jun. 1, 2010, XP 030007573, Total 42 pages.
Communication dated Jun. 23, 2015, issued by the Japanese Patent Office in counterpart Japanese Application No. 2014-195741.
Communication dated Jun. 23, 2015, issued by the Japanese Patent Office in counterpart Japanese Application No. 2014-195742.
Communication dated Jun. 30, 2015, issued by the Intellectual Property Corporation of Malaysia in counterpart Malaysian Application No. PI 2013003047.
Communication dated Jul. 1, 2015, issued by the European Patent Office in counterpart European Application No. 13185335.0.
Communication dated Jul. 20, 2015, issued by the Korean Intellectual Property Office in counterpart Korean Application No. 10-2014-0148714.
Communication dated Aug. 5, 2015, issued by the State Intellectual Property Office of the People's Republic of China in counterpart Chinese Application No. 201510001768.5.
Communication dated Mar. 31, 2015 issued by the Russian Patent Office in counterpart Russian Patent Application No. 2013112367.
Communication dated Mar. 31, 2015 issued by the Russian Patent Office in counterpart Russian Patent Application No. 2013112365.
Communication dated Mar. 31, 2015 issued by the Russian Patent Office in counterpart Russian Patent Application No. 2013112250.
Communication dated Jun. 15, 2015 issued by the Korean Patent Office in counterpart Korean Patent Application No. 10-2014-0058638.
Communication, Issued by the Canadian Intellectual Property Office, dated Jan. 23, 2015, In counterpart Canadian Application No. 2,820,901.
Communication, Issued by the Canadian Intellectual Property Office, dated Mar. 5, 2015, In counterpart Canadian Application No. 2,768,182.
Communication, Issued by the Canadian Intellectual Property Office, dated Feb. 2, 2015, In counterpart Canadian Application No. 2,877,229.
Communication, Issued by the State Intellectual Property Office of P.R. China, dated Apr. 9, 2015, in counterpart Chinese Application No. 201080036026.1.
Communication, Issued by the Japan Patent Office, dated Oct. 21, 2014, In counterpart Japanese Application No. 2012-524655.
Communication, Issued by the State Intellectual Property Office of P.R. China, dated Nov. 4, 2014, In counterpart Chinese Application No. 201080036026.1.
Communication, Issued by the Canadian Intellectual Property Office, dated Dec. 11, 2014, In Counterpart Canadian Application No. 2,820,905.
Communication dated Jul. 18, 2014 issued by the Korean Intellectual Property Office in counterpart Korean Application No. 10-2013-0048509.
Communication dated Aug. 15, 2014 issued by the Taiwanese Patent Office in counterpart Taiwanese Application No. 102129568.
Kwanghyun Won et al., "Motion Vector Coding using Decoder-side Estimation of Motion Vector", BMSB, May 2009, 5 pgs. total.
International Search Report (PCT/ISA/210) and Written Opinion (PCT/ISA/237) dated Feb. 24, 2011, in PCT Application No. PCT/KR2010/005365.
Communication dated Jul. 17, 2013, issued by the Taiwanese Patent Office in counterpart Taiwanese Application No. 102115939.
Communication dated Oct. 4, 2013, issued by IP Australia in counterpart Australian Patent Application No. 2010283121.
Communication, dated Nov. 21, 2013, issued by IP Australia in counterpart Australian Patent Application No. 2013201857.
Communication, dated Oct. 8, 2013, issued by IP Australia in counterpart Australian Patent Application No. 2013201858.
Communication, dated Oct. 17, 2013, issued by IP Australia in counterpart Australian Patent Application No. 2013201859.
Communication, dated Nov. 18, 2013, issued by the Taiwan Intellectual Property Office in counterpart Taiwanese Patent Application No. 102115937.
Communication, dated Nov. 26, 2013, issued by the Canadian Intellectual Property Office in counterpart Canadian Patent Application No. 2,820,553.
Communication, dated Dec. 10, 2013, issued by the Canadian Patent Office in counterpart Canadian Application No. 2,768,182.
Communication, dated Dec. 23, 2013, issued by the Taiwanese Patent Office in counterpart Taiwanese Application No. 102129568.
Communication, dated Feb. 10, 2014, issued by the European Patent Office in counterpart European Application No. 10808396.5.
Communication, dated Feb. 7, 2014, issued by the European Patent Office in counterpart European Application No. 13185336.8.
Communication, dated Feb. 7, 2014, issued by the European Patent Office in counterpart European Application No. 13185337.6.
Communication, dated Feb. 7, 2014, issued by the European Patent Office in counterpart European Application No. 13185335.0.
Yang, Jungyoup et al. "Motion Vector Coding with Optimal PMV Selection," 35th Video Coding Experts Group Meeting; ITU-Telecommunications Standardization Sector; Jul. 16-18, 2008; pp. 1-6.
Laroche, Guillaume, et al. "RD Optimized Coding for Motion Vector Predictor Selection," IEEE Transactions on Circuits and Systems for Video Technology, vol. 18, No. 9; Sep. 1, 2008; pp. 1247-1257.
Kim, Jaeil, et al. "Enlarging MB size for high fidelity video coding beyond HD," 36th Video Coding Experts Group Meeting; ITU-Telecommunications Standardization Sector, Oct. 8-10, 2008, pp. 1-6.
Yang, Jungyoup et al. "Motion Vector Coding with Optimal Predictor," Sungkyunkwan University and SK Telecom, International Organization for Standardization, Feb. 2009; pp. 1-7.
Tourapis, Alex, et al. "Motion Vector Prediction with Reference Frame Consideration," Proceedings of SPIE, vol. 5203, Applications of Digital Image Processing XXVI; Jan. 1, 2003; pp. 440-447.
Wiegand, Thomas, et al. "Overview of the H.264/AVC Video Coding Standard," IEEE Transactions on Circuits and Systems for Video Technology, vol. 13, No. 7; Jul. 1, 2003; pp. 560-576.
Communication from the Russian Patent Office dated Jan. 17, 2013, in a counterpart Application No. 2012104831/08.
Communication dated Apr. 7, 2014, issued by the Korean Intellectual Property Office in counterpart Korean Application No. 10-2009-0074896.
Communication dated Apr. 2, 2014, issued by the Taiwanese Patent Office in counterpart Taiwanese Application No. 102129571.
Communication dated Mar. 24, 2014, issued by the State Intellectual Property Office of the People's Republic of China in counterpart Chinese Application No. 201080036026.1.
Zhang, et al.; "Region-Based Coding of Motion Fields for Low-Bitrate Video Compression", International Conference on Image Processing, Oct. 2004, vol. 2, pp. 1117-1120.
Jung, et al., "Competition-Based Scheme for Motion Vector Selection and Coding", ITU Telecommunications Standardization Sector, Study Group 16 Question 8, Video Coding Experts Group (VCEG), 29th Meeting: Klagenfurt, Austria, Jul. 17-18, 2006, pp. 1-8.
Kamp, et al.; "Fast Decoder Side Motion Vector Derivation for Inter Frame Video Coding", Picture Coding Symposium, May 2009, pp. 1-4.
Sullivan, "Meeting Report for 29th VCEG Meeting", ITU-Telecommunications Standardization Sector, Study Group 16 Question 6, Video Coding Experts Group (VCEG), 29th Meeting: Klagenfurt Austria, Jul. 17, 2006, pp. 1-11.
Bjontegaard, et al; "Computational Efficiency AHG Report", ITU-Telecommunications Standardization Sector, Study Group 16 Question 6, Video Coding Exeperts Group (VCEG), 29th Meeting: Klagenfurt, Austria, Jul. 17-18, 2006, pp. 1.
Jung, "AHG Report—Error Prone Environments", ITU-Telecommunications Standardization Sector, Study Group 16 Question 6, Video Coding Experts Group (VCEG), 29th Meeting: Klagenfurt, Austria, Jul. 17-18, 2006, pp. 1.

(56) References Cited

OTHER PUBLICATIONS

Wedi, et al.; "AHG Report—Coding Efficiency", ITU-Telecommunications Standardization Sector, Study Group 16 Question 6, Video Coding Experts Group (VCEG), 29th Meeting: Klagenfurt, Austria, Jul. 17-18, 2006, pp. 1.

Tanizawa, et al.; "Simulation Results of Adaptive Quantization Matrix Selection on KTA Software", ITU-Telecommunications Standardization Sector, Study Group 16 Question 6, Video Coding Experts Group (VCEG), 29th Meeting: Klagenfurt, Austria, Jul. 17-18, 2006, pp. 1-4.

Tanizawa, et al.; "Simulation Results of Adaptive Quantization Matrix Selection on KTA Software", ITU-Telecommunications Standardization Sector, Study Group 16 Question 8, Video Coding Experts Group (VCEG), 29th Meeting: Klagenfurt, Austria, Jul. 17-18, 2006, Presentation, pp. 1-14.

wftp3.itu.int - /av-arch/video-site/0607_Kla/", searched on Apr. 28, 2014, Internet <URL: http://wftp3.itu.int/av-arch/video-site/0607_Kla/>.

Communication dated May 13, 2014, issued by the Japanese Patent Office in counterpart Japanese Application No. 2012-524655.

\* cited by examiner

FIG. 9
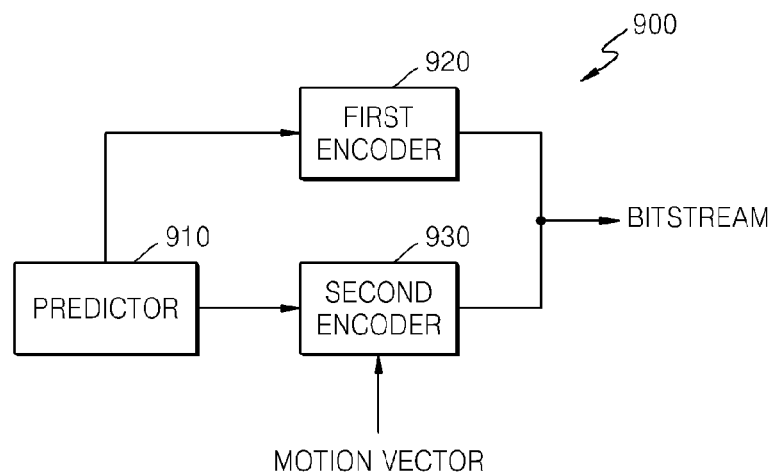
FIG. 10A   FIG. 10B
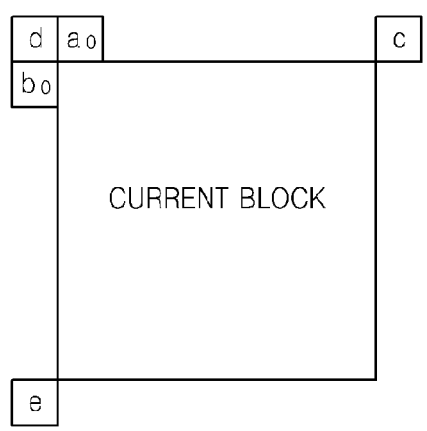   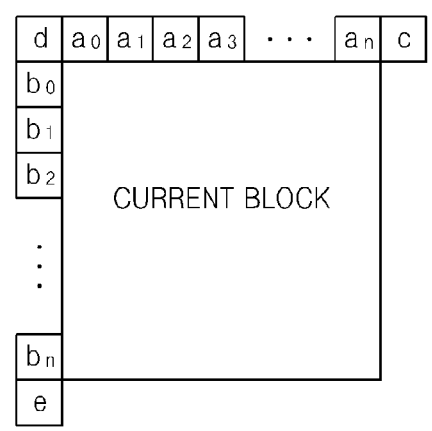

METHOD AND APPARATUS FOR ENCODING/DECODING MOTION VECTOR

CROSS-REFERENCE TO RELATED PATENT APPLICATION

This application is a continuation application of U.S. patent application Ser. No. 14/341,493, filed on Jul. 25, 2014, which is a continuation application of U.S. patent application Ser. No. 14/028,816, filed on Sep. 17, 2013, now U.S. Pat. No. 8,811,488, issued on Aug. 19, 2014, in the U.S. Patent and Trademark Office, which claims priority from U.S. patent application Ser. No. 12/856,197, filed on Aug. 13, 2010, now U.S. Pat. No. 8,537,897, issued on Sep. 17, 2013, in the U.S. Patent and Trademark Office, which claims priority from Korean Patent Application No. 10-2009-0074896, filed on Aug. 13, 2009 in the Korean Intellectual Property Office, the disclosures of which are incorporated herein by reference in their entireties.

BACKGROUND

1. Field

Apparatuses and methods consistent with exemplary embodiments relate to a method and apparatus for encoding a motion vector, and more particularly, to a method and apparatus for encoding a motion vector predictor of a current block.

2. Description of Related Art

A codec, such as Moving Pictures Experts Group (MPEG)-4 H.264/MPEG-4 Advanced Video Coding (AVC), uses motion vectors of previously encoded blocks adjacent to a current block to predict a motion vector of the current block. That is, a median of motion vectors of previously encoded blocks adjacent to left, upper, and upper-right sides of a current block is used as a motion vector predictor of the current block.

SUMMARY

Exemplary embodiments provide a method and apparatus for encoding and decoding a motion vector, and a computer readable recording medium storing a computer readable program for executing the method.

According to an aspect of an exemplary embodiment, there is provided a method of encoding a motion vector of a current block, the method including: selecting, as a mode of encoding information about a motion vector predictor of the current block, a first mode in which information indicating the motion vector predictor from among at least one motion vector predictor is encoded or a second mode in which information indicating generation of the motion vector predictor based on blocks or pixels included in a previously encoded area adjacent to the current block is encoded; determining the motion vector predictor of the current block according to the selected mode and encoding the information about the motion vector predictor of the current block; and encoding a difference vector between the motion vector of the current block and the motion vector predictor of the current block.

The selecting of the first mode or the second mode may include selecting the first mode or the second mode based on a depth indicating a degree of decreasing from a size of a maximum coding unit of a current picture or slice to a size of the current block.

The selecting of the first mode or the second mode may include selecting the first mode or the second mode in a unit of a current picture or slice including the current block.

The selecting of the first mode or the second mode may include selecting the first mode or the second mode based on whether the current block is encoded in a skip mode.

The at least one motion vector predictor may include a first motion vector of a block adjacent to a left side of the current block, a second motion vector of a block adjacent to an upper side of the current block, and a third motion vector of a block adjacent to an upper-right side of the current block.

The at least one motion vector predictor may further include a median value of the first motion vector, the second motion vector, and the third motion vector.

The at least one motion vector predictor may further include a motion vector predictor generated based on a motion vector of a block co-located with the current block in a reference picture and a temporal distance between the reference picture and a current picture.

The information indicating generation of the motion vector predictor based on blocks or pixels included in a previously encoded area adjacent to the current block may be information indicating generation of the motion vector predictor of the current block based on a median value of a first motion vector of a block adjacent to a left side of the current block, a second motion vector of a block adjacent to an upper side of the current block, and a third motion vector of a block adjacent to an upper-right side of the current block.

The information indicating generation of the motion vector predictor based on blocks or pixels included in a previously encoded area adjacent to the current block may be information indicating generation of the motion vector predictor of the current block based on a motion vector generated by searching a reference picture using pixels included in the previously encoded area adjacent to the current block.

According to an aspect of another exemplary embodiment, there is provided an apparatus for encoding a motion vector of a current block, the apparatus including: a predictor which selects, as a mode of encoding information about a motion vector predictor of the current block, a first mode in which information indicating the motion vector predictor from among at least one motion vector predictor is encoded or a second mode in which information indicating generation of the motion vector predictor based on blocks or pixels included in a previously encoded area adjacent to the current block is encoded, and which determines the motion vector predictor of the current block based on the selected mode; a first encoder which encodes the information about the motion vector predictor of the current block determined based on the selected mode; and a second encoder which encodes a difference vector between a motion vector of the current block and the motion vector predictor of the current block.

According to an aspect of another exemplary embodiment, there is provided a method of decoding a motion vector of a current block, the method including: decoding information about a motion vector predictor of the current block encoded according to a mode selected from among a first mode and a second mode; decoding a difference vector between the motion vector of the current block and the motion vector predictor of the current block; generating the motion vector predictor of the current block based on the decoded information about the motion vector predictor of the current block; and restoring the motion vector of the current block based on the motion vector predictor and the difference vector, wherein the first mode is a mode in which information indicating the motion vector predictor from among at least one motion vector predictor is encoded and the second mode is a mode in which information indicating generation of the motion vector predictor based on blocks or pixels included in a previously decoded area adjacent to the current block is encoded.

According to an aspect of another exemplary embodiment, there is provided an apparatus for decoding a motion vector of a current block, the apparatus including: a first decoder which decodes information about a motion vector predictor of the current block encoded according to a mode selected from among a first mode and a second mode; a second decoder which decodes a difference vector between the motion vector of the current block and the motion vector predictor of the current block; a predictor which generates the motion vector predictor of the current block based on the decoded information about the motion vector predictor of the current block; and a motion vector restoring unit which restores the motion vector of the current block based on the motion vector predictor and the difference vector, wherein the first mode is a mode in which information indicating the motion vector predictor from among at least one motion vector predictor is encoded and the second mode is a mode in which information indicating generation of the motion vector predictor based on blocks or pixels included in a previously decoded area adjacent to the current block is encoded.

According to an aspect of another exemplary embodiment, there is provided a computer readable recording medium storing a computer readable program for executing the method of encoding a motion vector and the method of decoding a motion vector.

BRIEF DESCRIPTION OF THE DRAWINGS

The above and/or other aspects will become more apparent by describing in detail exemplary embodiments with reference to the attached drawings in which:

FIG. 9 is a block diagram of an apparatus for encoding a motion vector, according to an exemplary embodiment;

FIGS. 10A and 10B illustrate motion vector predictor candidates of an explicit mode, according to an exemplary embodiment;

DETAILED DESCRIPTION OF EXEMPLARY EMBODIMENTS

Figure 1:
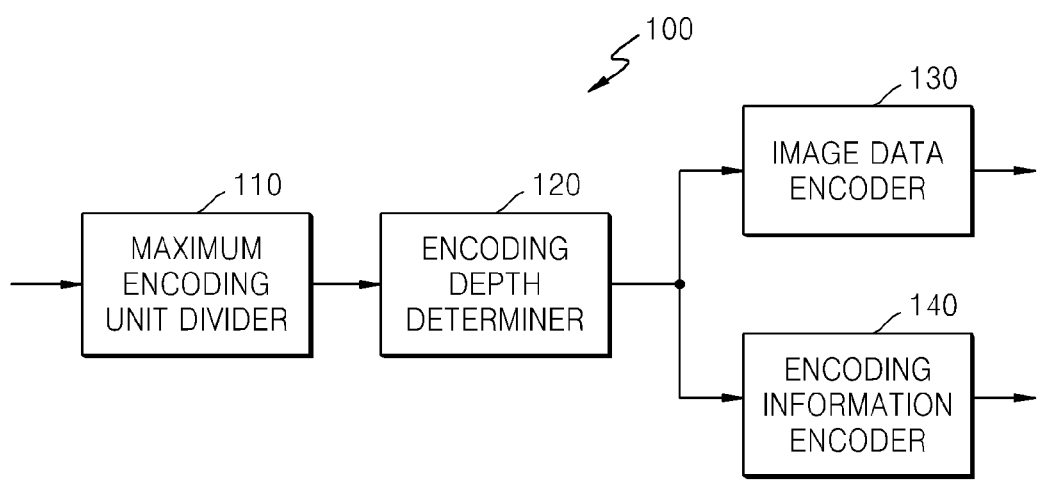
FIG. 1 is a block diagram of an apparatus for encoding an image according to an exemplary embodiment.

Exemplary embodiments will now be described more fully with reference to the accompanying drawings, in which like reference numerals refer to like elements throughout. Expressions such as "at least one of," when preceding a list of elements, modify the entire list of elements and do not modify the individual elements of the list. In the present specification, an "image" may denote a still image for a video or a moving image, that is, the video itself.

FIG. 1 is a block diagram of an apparatus 100 for encoding an image, according to an exemplary embodiment. Referring to FIG. 1, the apparatus 100 includes a maximum coding unit divider 110, an encoding depth determiner 120, an image data encoder 130, and an encoding information encoder 140.

The maximum coding unit divider 110 can divide a current picture or slice based on a maximum coding unit that is an encoding unit of a largest size. That is, the maximum coding unit divider 110 can divide the current picture or slice to obtain at least one maximum coding unit.

According to an exemplary embodiment, a coding unit may be represented using a maximum coding unit and a depth. As described above, the maximum coding unit indicates a coding unit having the largest size from among coding units of the current picture, and the depth indicates the size of a sub coding unit obtained by hierarchically decreasing the coding unit. As the depth increases, the coding unit can decrease from a maximum coding unit to a minimum coding unit, wherein a depth of the maximum coding unit is defined as a minimum depth and a depth of the minimum coding unit is defined as a maximum depth. Since the size of the coding unit decreases from the maximum coding unit as the depth increases, a sub coding unit of a $k^{th}$ depth can include a plurality of sub coding units of a $(k+n)^{th}$ depth (where k and n are integers equal to or greater than 1).

According to an increase of the size of a picture to be encoded, encoding an image in a greater coding unit can cause a higher image compression ratio. However, if a greater coding unit is fixed, an image may not be efficiently encoded by reflecting continuously changing image characteristics.

For example, when a smooth area such as the sea or the sky is encoded, the greater a coding unit is, the more a compression ratio can increase. However, when a complex area such as people or buildings is encoded, the smaller a coding unit is, the more a compression ratio can increase.

Accordingly, according to an exemplary embodiment, a different maximum image coding unit and a different maximum depth are set for each picture or slice. Since a maximum depth denotes the maximum number of times by which a coding unit can decrease, the size of each minimum coding unit included in a maximum image coding unit can be variably set according to a maximum depth.

The encoding depth determiner 120 determines a maximum depth. For example, the maximum depth can be determined based on calculation of Rate-Distortion (R-D) cost. Furthermore, the maximum depth may be determined differently for each picture or slice or for each maximum coding unit. The determined maximum depth is provided to the encoding information encoder 140, and image data according to maximum coding units is provided to the image data encoder 130.

The maximum depth denotes a coding unit having the smallest size that can be included in a maximum coding unit, i.e., a minimum coding unit. In other words, a maximum coding unit can be divided into sub coding units having different sizes according to different depths. This will be described in detail later with reference to FIGS. 8A and 8B. In addition, the sub coding units having different sizes, which are included in the maximum coding unit, can be predicted or transformed based on processing units having different sizes. In other words, the apparatus 100 can perform a plurality of processing operations for image encoding based on processing units having various sizes and various shapes. To encode image data, processing operations such as prediction, transformation, and entropy encoding are performed, wherein processing units having the same size may be used for every operation or processing units having different sizes may be used for every operation.

For example, the apparatus 100 may select a processing unit that is different from a coding unit to predict the coding unit. When the size of a coding unit is 2N×2N (where N is a positive integer), processing units for prediction may be 2N×2N, 2N×N, N×2N, and N×N. In other words, motion prediction may be performed based on a processing unit having a shape whereby at least one of height and width of a coding unit is equally divided by two. Hereinafter, a processing unit, which is the base of prediction, is referred to as a prediction unit.

A prediction mode may be at least one of an intra mode, an inter mode, and a skip mode, and a specific prediction mode may be performed for only a prediction unit having a specific size or shape. For example, the intra mode may be performed for only prediction units having sizes of 2N×2N and N×N of which the shape is a square. Further, the skip mode may be performed for only a prediction unit having a size of 2N×2N. If a plurality of prediction units exist in a coding unit, the prediction mode with the least encoding errors may be selected after performing prediction for every prediction unit.

Alternatively, the apparatus 100 may perform frequency transformation on image data based on a processing unit having a different size from a coding unit. For the frequency transformation in the coding unit, the frequency transformation can be performed based on a processing unit having a size equal to or less than that of the coding unit. Hereinafter, a processing unit, which is the base of frequency transformation, is referred to as a transformation unit. The frequency transformation may be a Discrete Cosine Transform (DCT) or a Karhunen-Loeve Transform (KLT).

The encoding depth determiner 120 can determine sub coding units included in a maximum coding unit using R-D optimization based on a Lagrangian multiplier. In other words, the encoding depth determiner 120 can determine which shape a plurality of sub coding units divided from the maximum coding unit have, wherein the plurality of sub coding units have different sizes according to their depths. The image data encoder 130 outputs a bitstream by encoding the maximum coding unit based on the division shapes determined by the encoding depth determiner 120.

The encoding information encoder 140 encodes information about an encoding mode of the maximum coding unit determined by the encoding depth determiner 120. In other words, the encoding information encoder 140 outputs a bitstream by encoding information about a division shape of the maximum coding unit, information about the maximum depth, and information about an encoding mode of a sub coding unit for each depth. The information about the encoding mode of the sub coding unit may include at least one of information about a prediction unit of the sub coding unit, information about a prediction mode for each prediction unit, and information about a transformation unit of the sub coding unit.

Since sub coding units having different sizes exist for each maximum coding unit and information about an encoding mode is determined for each sub coding unit, information about at least one encoding mode may be determined for one maximum coding unit.

The apparatus 100 may generate sub coding units by equally dividing both height and width of a maximum coding unit by two according to an increase of depth. That is, when the size of a coding unit of a $k^{th}$ depth is 2N×2N, the size of a coding unit of a $(k+1)^{th}$ depth may be N×N.

Accordingly, the apparatus 100 according to an exemplary embodiment can determine an optimal division shape for each maximum coding unit based on sizes of maximum coding units and a maximum depth in consideration of image characteristics. By variably adjusting the size of a maximum coding unit in consideration of image characteristics and encoding an image through division of a maximum coding unit into sub coding units of different depths, images having various resolutions can be more efficiently encoded.

Figure 2:
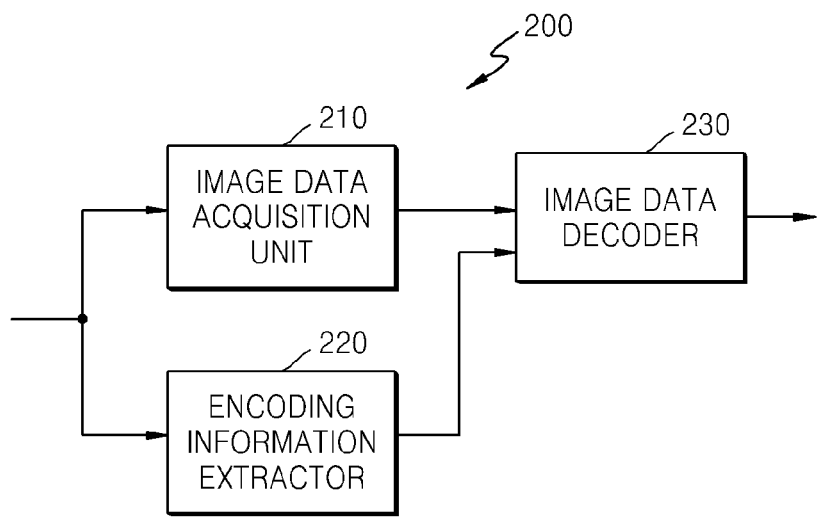
FIG. 2 is a block diagram of an apparatus for decoding an image according to an exemplary embodiment.

FIG. 2 is a block diagram of an apparatus 200 for decoding an image according to an exemplary embodiment. Referring to FIG. 2, the apparatus 200 includes an image data acquisition unit 210, an encoding information extractor 220, and an image data decoder 230.

The image data acquisition unit 210 acquires image data according to maximum coding units by parsing a bitstream received by the apparatus 200 and outputs the image data to the image data decoder 230. The image data acquisition unit 210 may extract information about a maximum coding unit of a current picture or slice from a header of the current picture or slice. In other words, the image data acquisition unit 210 divides the bitstream in the maximum coding unit so that the image data decoder 230 can decode the image data according to maximum coding units.

The encoding information extractor 220 extracts information about a maximum coding unit, a maximum depth, a division shape of the maximum coding unit, and an encoding mode of sub coding units by parsing the bitstream received by the apparatus 200. For example, the encoding information extractor 220 may extract the above-described information from the header of the current picture. The information about the division shape and the information about the encoding mode are provided to the image data decoder 230.

The information about the division shape of the maximum coding unit may include information about sub coding units having different sizes according to depths included in the maximum coding unit, and the information about the encoding mode may include at least one of information about a prediction unit according to sub coding unit, information about a prediction mode, and information about a transformation unit.

The image data decoder 230 restores the current picture by decoding image data of every maximum coding unit based on the information extracted by the encoding information extractor 220. The image data decoder 230 can decode sub coding units included in a maximum coding unit based on the information about the division shape of the maximum coding unit. A decoding process may include at least one of a prediction process including intra prediction and motion compensation and an inverse transformation process.

Furthermore, the image data decoder 230 can perform intra prediction or inter prediction based on the information about the prediction unit and the information about the prediction mode in order to predict a prediction unit. The image data decoder 230 can also perform inverse transformation for each sub coding unit based on the information about the transformation unit of a sub coding unit.

Figure 3:
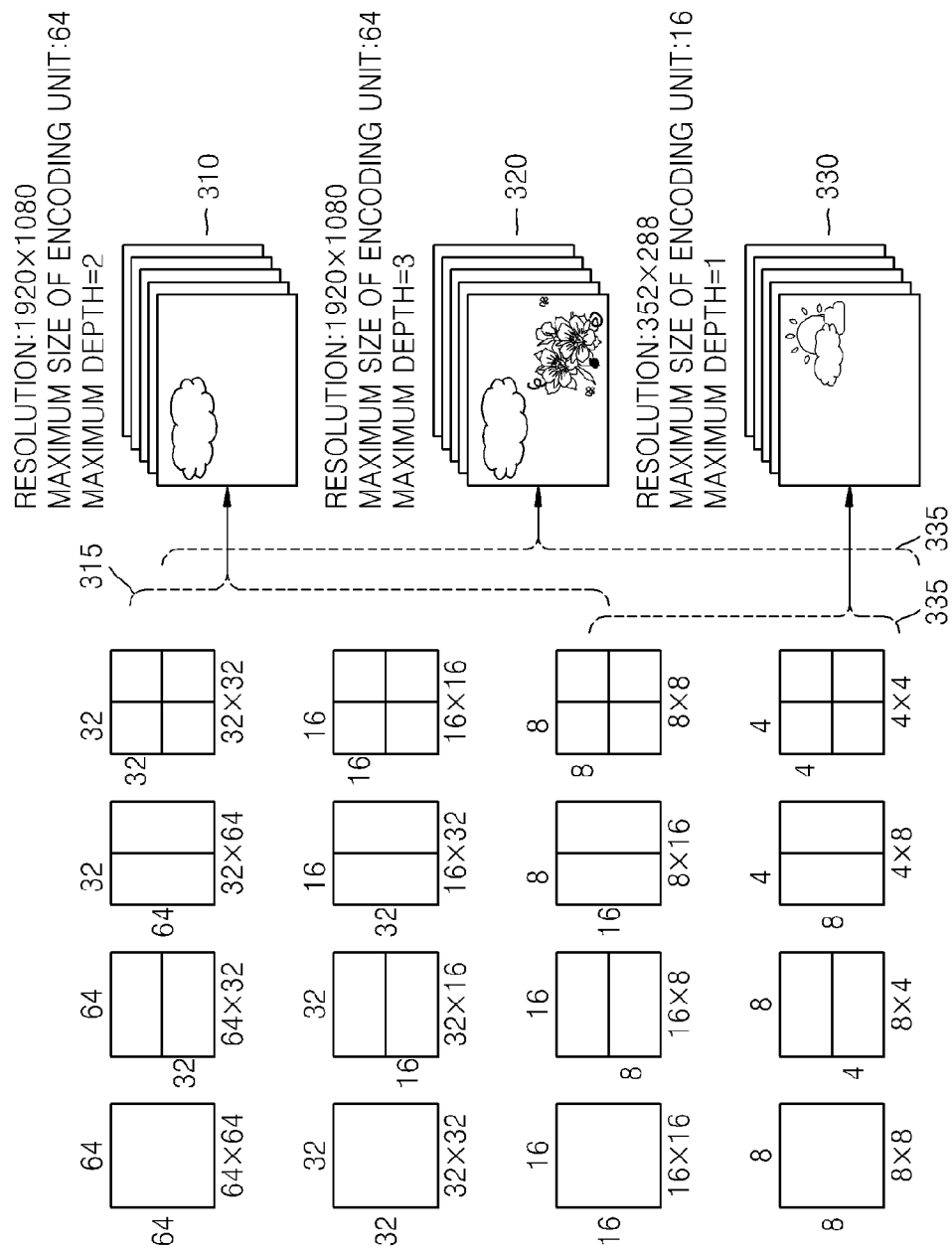
FIG. 3 illustrates hierarchical coding units according to an exemplary embodiment.

FIG. 3 illustrates hierarchical coding units according to an exemplary embodiment. Referring to FIG. 3, the exemplary hierarchical coding units include coding units whose sizes are 64×64, 32×32, 16×16, 8×8, and 4×4. Furthermore, coding units whose sizes are 64×32, 32×64, 32×16, 16×32, 16×8, 8×16, 8×4, and 4×8 may also exist.

In the exemplary embodiment illustrated in FIG. 3, for first image data 310 whose resolution is 1920×1080, the size of a maximum coding unit is set to 64×64, and a maximum depth is set to 2. For second image data 320 whose resolution is 1920×1080, the size of a maximum coding unit is set to 64×64, and a maximum depth is set to 3. For third image data 330 whose resolution is 352×288, the size of a maximum coding unit is set to 16×16, and a maximum depth is set to 1.

When the resolution is high or the amount of data is great, a maximum size of a coding unit may be relatively large to increase a compression ratio and exactly reflect image characteristics. Accordingly, for the first and second image data 310 and 320 having higher resolution than the third image data 330, 64×64 may be selected as the size of the maximum coding unit.

A maximum depth indicates the total number of layers in the hierarchical coding units. Since the maximum depth of the first image data 310 is 2, a coding unit 315 of the image data 310 can include a maximum coding unit whose longer axis size is 64 and sub coding units whose longer axis sizes are 32 and 16, according to an increase of a depth.

On the other hand, since the maximum depth of the third image data 330 is 1, a coding unit 335 of the image data 330 can include a maximum coding unit whose longer axis size is 16 and coding units whose longer axis sizes is 8, according to an increase of a depth.

However, since the maximum depth of the second image data 320 is 3, a coding unit 325 of the image data 320 can include a maximum coding unit whose longer axis size is 64 and sub coding units whose longer axis sizes are 32, 16, and 8 according to an increase of a depth. Since an image is encoded based on a smaller sub coding unit as a depth increases, exemplary embodiments are suitable for encoding an image including more minute scenes.

Figure 4:
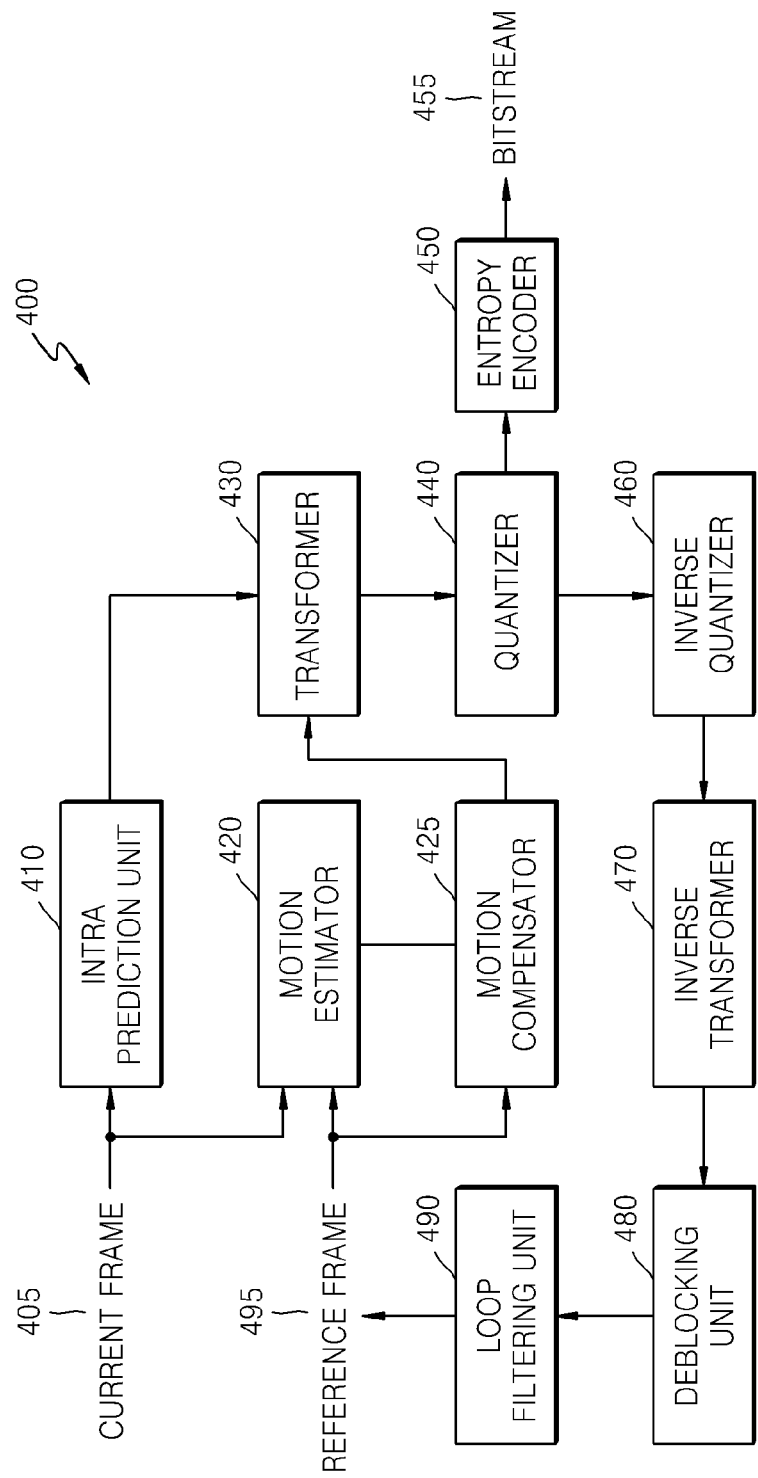
FIG. 4 is a block diagram of an image encoder based on a coding unit, according to an exemplary embodiment.

FIG. 4 is a block diagram of an image encoder 400 based on a coding unit, according to an exemplary embodiment. Referring to FIG. 4, an intra predictor 410 performs intra prediction on prediction units of the intra mode in a current frame 405, and a motion estimator 420 and a motion compensator 425 perform inter prediction and motion compensation on prediction units of the inter mode using the current frame 405 and a reference frame 495.

Residual values are generated based on the prediction units output from the intra predictor 410, the motion estimator 420, and the motion compensator 425. The generated residual values are output as quantized transform coefficients by passing through a transformer 430 and a quantizer 440.

The quantized transform coefficients are restored to residual values by passing through an inverse-quantizer 460 and an inverse transformer 470. The restored residual values are post-processed by passing through a deblocking unit 480 and a loop filtering unit 490 and output as the reference frame 495. The quantized transform coefficients may be output as a bitstream 455 by passing through an entropy encoder 450.

To perform encoding based on an encoding method according to an exemplary embodiment, components of the image encoder 400, i.e., the intra predictor 410, the motion estimator 420, the motion compensator 425, the transformer 430, the quantizer 440, the entropy encoder 450, the inverse-quantizer 460, the inverse-transformer 470, the deblocking unit 480 and the loop filtering unit 490, perform image encoding processes based on a maximum coding unit, a sub coding unit according to depths, a prediction unit, and a transformation unit.

Figure 5:
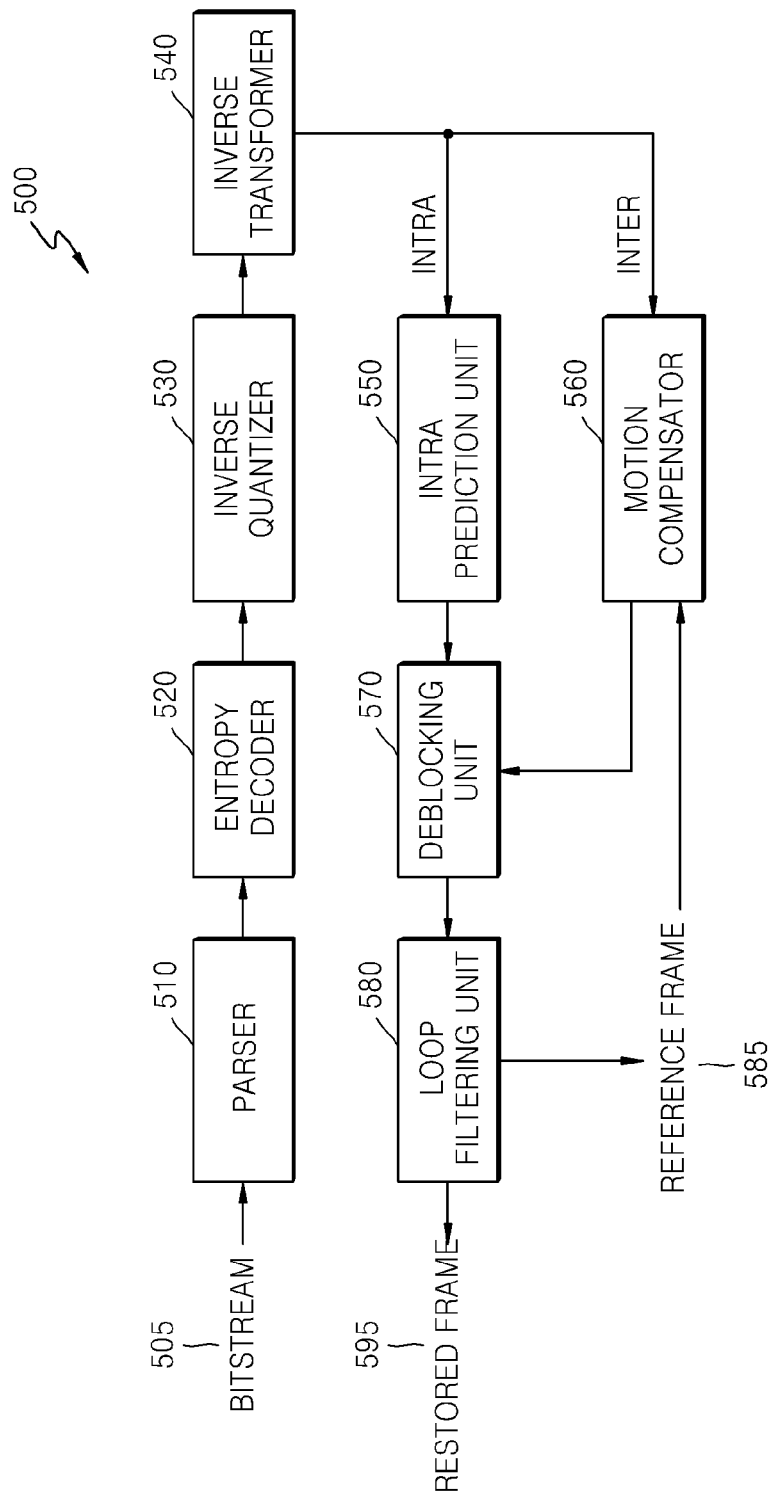
FIG. 5 is a block diagram of an image decoder based on a coding unit, according to an exemplary embodiment.

FIG. 5 is a block diagram of an image decoder 500 based on a coding unit, according to an exemplary embodiment. Referring to FIG. 5, a bitstream 505 passes through a parser 510 so that encoded image data to be decoded and encoding information used for decoding are parsed. The encoded image data is output as inverse-quantized data by passing through an entropy decoder 520 and an inverse-quantizer 530 and restored to residual values by passing through an inverse-transformer 540. The residual values are restored according to coding units by being added to an intra prediction result of an intra predictor 550 or a motion compensation result of a motion compensator 560. The restored coding units are used for prediction of next coding units or a next picture by passing through a deblocking unit 570 and a loop filtering unit 580.

To perform decoding based on a decoding method according to an exemplary embodiment, components of the image decoder 500, i.e., the parser 510, the entropy decoder 520, the inverse-quantizer 530, the inverse-transformer 540, the intra predictor 550, the motion compensator 560, the deblocking unit 570 and the loop filtering unit 580, perform image decoding processes based on a maximum coding unit, a sub coding unit according to depths, a prediction unit, and a transformation unit.

In particular, the intra predictor 550 and the motion compensator 560 determine a prediction unit and a prediction mode in a sub coding unit by considering a maximum coding unit and a depth, and the inverse-transformer 540 performs inverse transformation by considering the size of a transformation unit.

Figure 6:
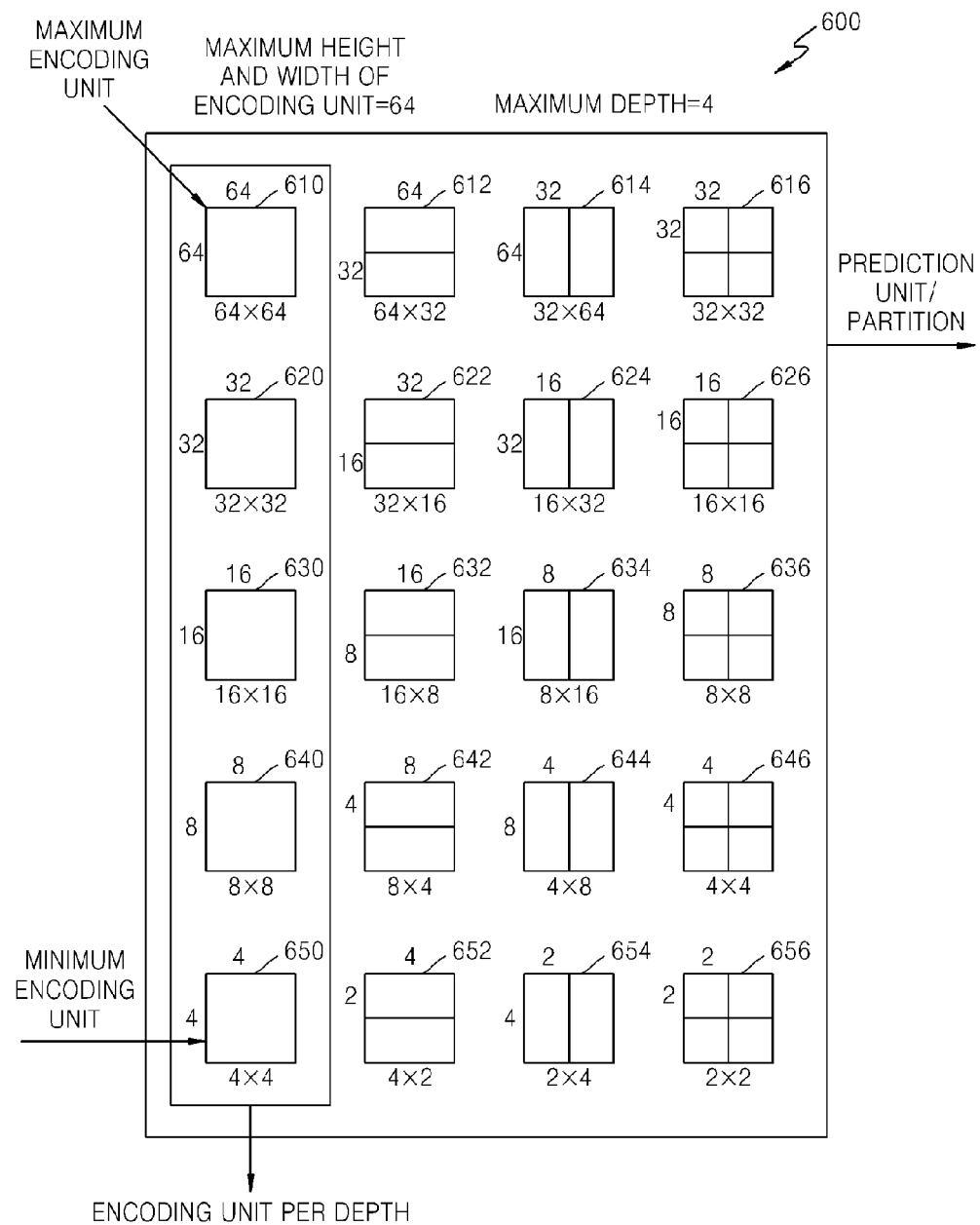
FIG. 6 illustrates a maximum coding unit, a sub coding unit, and a prediction unit, according to an exemplary embodiment.

FIG. 6 illustrates a maximum coding unit, a sub coding unit, and a prediction unit, according to an exemplary embodiment.

As described above, the encoding apparatus 100 and the decoding apparatus 200 according to one or more exemplary embodiments use hierarchical coding units to perform encoding and decoding in consideration of image characteristics. A maximum coding unit and a maximum depth can be adaptively set according to the image characteristics or variously set according to requirements of a user.

Referring to FIG. 6, a hierarchical coding unit structure 600 according to an exemplary embodiment illustrates a maximum coding unit 610 whose height and width are 64 and maximum depth is 4. A depth increases along a vertical axis of the hierarchical coding unit structure 600, and as a depth increases, heights and widths of sub coding units 620 to 650 decrease. Prediction units of the maximum coding unit 610 and the sub coding units 620 to 650 are shown along a horizontal axis of the hierarchical coding unit structure 600.

The maximum coding unit 610 has a depth of 0 and a size, i.e., height and width, of 64×64. A depth increases along the vertical axis, such that there exist a sub coding unit 620 whose size is 32×32 and depth is 1, a sub coding unit 630 whose size is 16×16 and depth is 2, a sub coding unit 640 whose size is 8×8 and depth is 3, and a sub coding unit 650 whose size is 4×4 and depth is 4. The sub coding unit 650 whose size is 4×4 and depth is 4 is a minimum coding unit. The minimum coding unit 650 may be divided into prediction units, each of which is less than the minimum coding unit.

In the exemplary embodiment illustrated in FIG. 6, examples of a prediction unit are shown along the horizontal axis according to each depth. That is, a prediction unit of the maximum coding unit 610 whose depth is 0 may be a prediction unit whose size is equal to the coding unit 610, i.e., 64×64, or a prediction unit 612 whose size is 64×32, a prediction unit 614 whose size is 32×64, or a prediction unit 616 whose size is 32×32, which have a size smaller than the coding unit 610 whose size is 64×64.

A prediction unit of the coding unit 620 whose depth is 1 and size is 32×32 may be a prediction unit whose size is equal to the coding unit 620, i.e., 32×32, or a prediction unit 622 whose size is 32×16, a prediction unit 624 whose size is 16×32, or a prediction unit 626 whose size is 16×16, which have a size smaller than the coding unit 620 whose size is 32×32.

A prediction unit of the coding unit 630 whose depth is 2 and size is 16×16 may be a prediction unit whose size is equal to the coding unit 630, i.e., 16×16, or a prediction unit 632 whose size is 16×8, a prediction unit 634 whose size is 8×16, or a prediction unit 636 whose size is 8×8, which have a size smaller than the coding unit 630 whose size is 16×16.

A prediction unit of the coding unit 640 whose depth is 3 and size is 8×8 may be a prediction unit whose size is equal to the coding unit 640, i.e., 8×8, or a prediction unit 642 whose size is 8×4, a prediction unit 644 whose size is 4×8, or a prediction unit 646 whose size is 4×4, which have a size smaller than the coding unit 640 whose size is 8×8.

The coding unit 650 whose depth is 4 and size is 4×4 is a minimum coding unit and a coding unit of a maximum depth. A prediction unit of the coding unit 650 may be a prediction unit 650 whose size is 4×4, a prediction unit 652 having a size of 4×2, a prediction unit 654 having a size of 2×4, or a prediction unit 656 having a size of 2×2.

Figure 7:
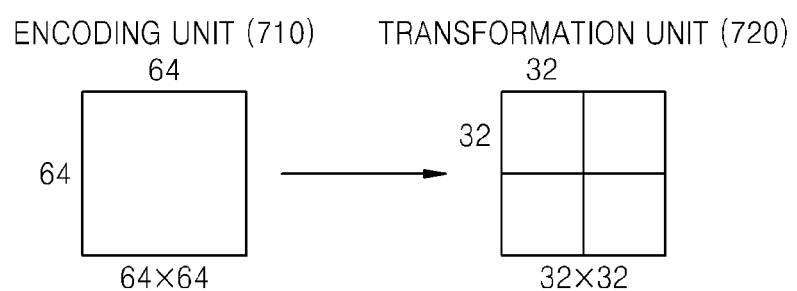
FIG. 7 illustrates a coding unit and a transformation unit, according to an exemplary embodiment.

FIG. 7 illustrates a coding unit and a transformation unit, according to an exemplary embodiment. The encoding apparatus 100 and the decoding apparatus 200, according to one or more exemplary embodiments, perform encoding with a maximum coding unit itself or with sub coding units, which are equal to or smaller than the maximum coding unit and divided from the maximum coding unit.

In the encoding process, the size of a transformation unit for frequency transformation is selected to be no larger than that of a corresponding coding unit. For example, when a current coding unit 710 has a size of 64×64, frequency transformation can be performed using a transformation unit 720 having a size of 32×32.

Figure 8A:
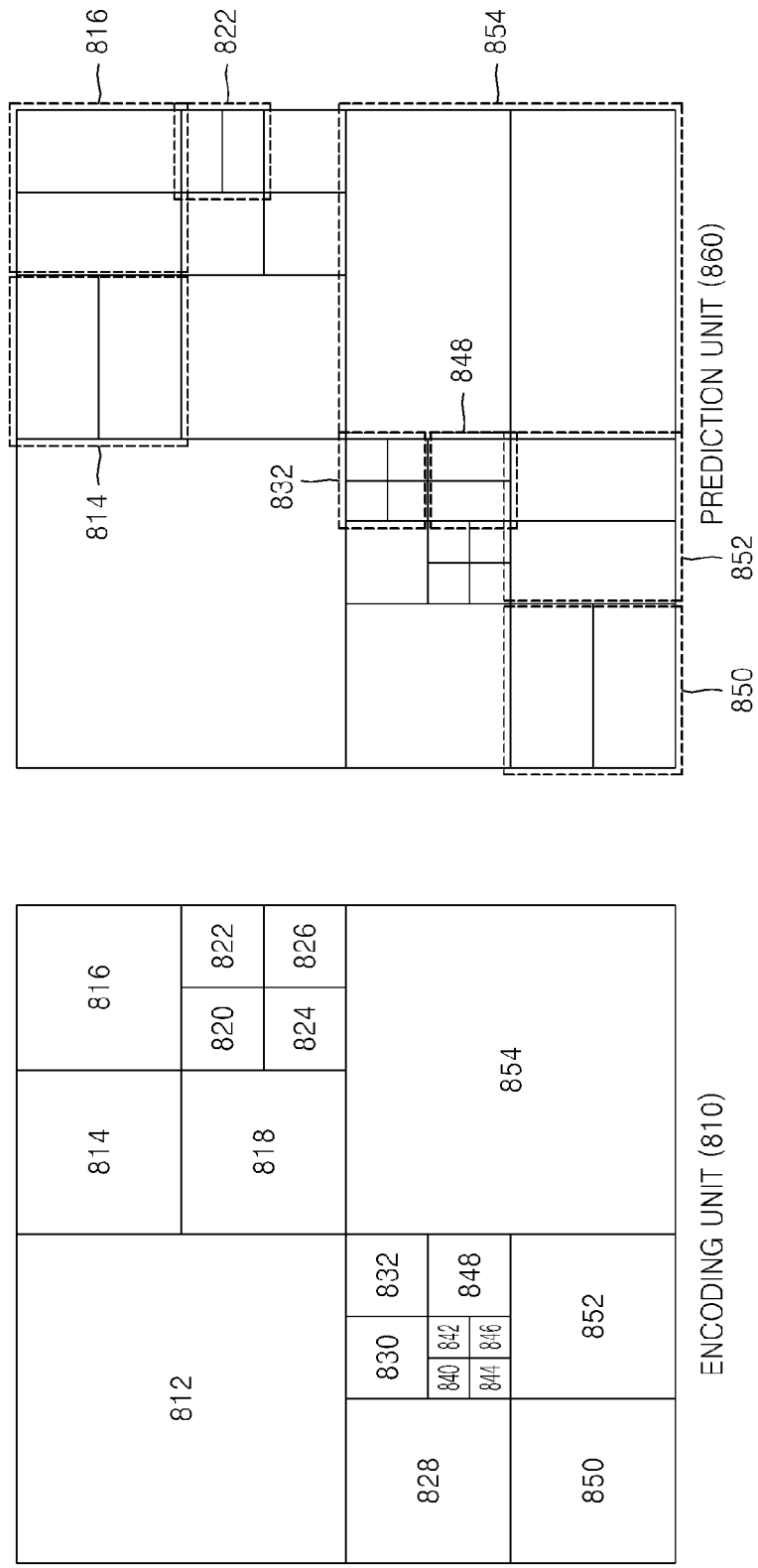
FIGS. 8A and 8B illustrate division shapes of a coding unit, a prediction unit, and a transformation unit, according to an exemplary embodiment.
Figure 8B:
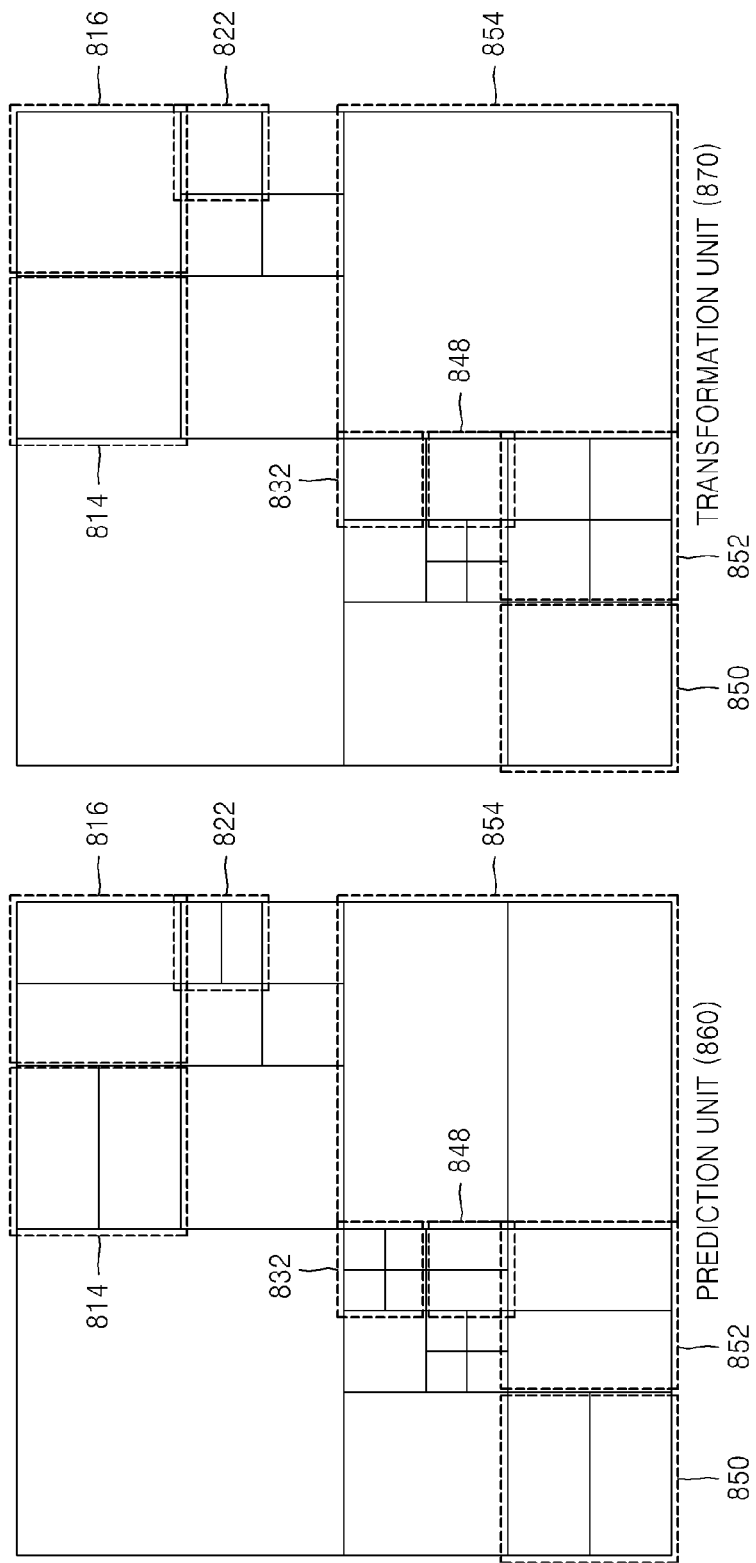

FIGS. 8A and 8B illustrate division shapes of a coding unit, a prediction unit, and a transformation unit, according to an exemplary embodiment. FIG. 8A illustrates a coding unit and a prediction unit, according to an exemplary embodiment.

A left side of FIG. 8A shows a division shape selected by an encoding apparatus 100 according to an exemplary embodiment in order to encode a maximum coding unit 810. The apparatus 100 divides the maximum coding unit 810 into various shapes, performs encoding, and selects an optimal division shape by comparing encoding results of various division shapes with each other based on R-D cost. When it is optimal that the maximum coding unit 810 is encoded as is, the maximum coding unit 810 may be encoded without dividing the maximum coding unit 810 as illustrated in FIGS. 8A and 8B.

Referring to the left side of FIG. 8A, the maximum coding unit 810 whose depth is 0 is encoded by dividing the maximum coding unit into sub coding units whose depths are equal to or greater than 1. That is, the maximum coding unit 810 is divided into 4 sub coding units whose depths are 1, and all or some of the sub coding units whose depths are 1 are divided into sub coding units whose depths are 2.

A sub coding unit located in an upper-right side and a sub coding unit located in a lower-left side among the sub coding units whose depths are 1 are divided into sub coding units whose depths are equal to or greater than 2. Some of the sub coding units whose depths are equal to or greater than 2 may be divided into sub coding units whose depths are equal to or greater than 3.

The right side of FIG. 8A shows a division shape of a prediction unit for the maximum coding unit 810. Referring to the right side of FIG. 8A, a prediction unit 860 for the maximum coding unit 810 can be divided differently from the maximum coding unit 810. In other words, a prediction unit for each of sub coding units can be smaller than a corresponding sub coding unit.

For example, a prediction unit for a sub coding unit 854 located in a lower-right side among the sub coding units whose depths are 1 can be smaller than the sub coding unit 854. In addition, prediction units for some sub coding units 814, 816, 850, and 852 of sub coding units 814, 816, 818, 828, 850, and 852 whose depths are 2 can be smaller than the sub coding units 814, 816, 850, and 852, respectively. In addition, prediction units for sub coding units 822, 832, and 848 whose depths are 3 can be smaller than the sub coding units 822, 832, and 848, respectively. The prediction units may have a shape whereby respective sub coding units are equally divided by two in a direction of height or width or have a shape whereby respective sub coding units are equally divided by four in directions of height and width.

FIG. 8B illustrates a prediction unit and a transformation unit, according to an exemplary embodiment. A left side of FIG. 8B shows a division shape of a prediction unit for the maximum coding unit 810 shown in the right side of FIG. 8A, and a right side of FIG. 8B shows a division shape of a transformation unit of the maximum coding unit 810.

Referring to the right side of FIG. 8B, a division shape of a transformation unit 870 can be set differently from the prediction unit 860. For example, even though a prediction unit for the coding unit 854 whose depth is 1 is selected with a shape whereby the height of the coding unit 854 is equally divided by two, a transformation unit can be selected with the same size as the coding unit 854. Likewise, even though prediction units for coding units 814 and 850 whose depths are 2 are selected with a shape whereby the height of each of the coding units 814 and 850 is equally divided by two, a transformation unit can be selected with the same size as the original size of each of the coding units 814 and 850.

A transformation unit may be selected with a smaller size than a prediction unit. For example, when a prediction unit for the coding unit 852 whose depth is 2 is selected with a shape whereby the width of the coding unit 852 is equally divided by two, a transformation unit can be selected with a shape whereby the coding unit 852 is equally divided by four in directions of height and width, which has a smaller size than the shape of the prediction unit.

FIG. 9 is a block diagram of an apparatus 900 for encoding a motion vector, according to an exemplary embodiment. The apparatus 900 for encoding a motion vector may be included in the apparatus 100 described above with reference to FIG. 1 or the image encoder 400 described above with reference to FIG. 4. Referring to FIG. 9, the motion vector encoding apparatus 900 includes a predictor 910, a first encoder 920, and a second encoder 930.

In order to decode a block encoded using inter prediction, i.e., inter-picture prediction, information about a motion vector indicating a position difference between a current block and a similar block in a reference picture is used. Thus, information about motion vectors is encoded and inserted into a bitstream in an image encoding process. However, if the information about motion vectors is encoded and inserted as is, an overhead for encoding the information about motion vectors increases, thereby decreasing a compression ratio of image data.

Therefore, in an image encoding process, information about a motion vector is compressed by predicting a motion vector of a current block, encoding only a differential vector between a motion vector predictor generated as a result of prediction and an original motion vector, and inserting the encoded differential vector into a bitstream. FIG. 9 illustrates an apparatus 900 for encoding a motion vector which uses such a motion vector predictor.

Referring to FIG. 9, the predictor 910 determines whether a motion vector of a current block is prediction-encoded based on an explicit mode or an implicit mode.

As described above, such a codec as MPEG-4 H.264/MPEG-4 AVC uses motion vectors of previously encoded blocks adjacent to a current block to predict a motion vector of the current block. That is, a median of motion vectors of previously encoded blocks adjacent to left, upper, and upper-right sides of the current block is used as a motion vector predictor of the current block. Since motion vectors of all blocks encoded using inter prediction are predicted using the same method, information about a motion vector predictor does not have to be encoded separately. However, the apparatus 100 or the image decoder 400 according to one or more exemplary embodiments uses both a mode in which information about a motion vector predictor is not encoded separately and a mode in which information about a motion vector predictor is encoded in order to more exactly predict a motion vector, which will now be described in detail.

(1) Explicit Mode

One of methods of encoding a motion vector predictor, which can be selected by the predictor 910, may implement a mode of explicitly encoding information about a motion vector predictor of a current block. This explicit mode is a mode of calculating at least one motion vector predictor candidate and separately encoding information indicating which motion vector predictor is used to predict a motion vector of a current block. Motion vector predictor candidates according to one or more exemplary embodiments will now be described with reference to FIGS. 10A, 10B, and 11A to 11C.

FIGS. 10A and 10B illustrate motion vector predictor candidates of an explicit mode, according to one or more exemplary embodiments. Referring to FIG. 10A, a motion vector predicting method according to an exemplary embodiment can use one of motion vectors of previously encoded blocks adjacent to a current block as a motion vector predictor of the current block. A block $a_0$ in the leftmost among blocks adjacent to an upper side of the current block, a block $b_0$ in the upper-most among blocks adjacent to a left side thereof, a block c adjacent to an upper-right side thereof, a block d adjacent to an upper-left side thereof, and a block e adjacent to a lower-right side thereof can be used for motion vector predictors of the current block.

Referring to FIG. 10B, motion vectors of all blocks adjacent to a current block can be used as motion vector predictors of the current block. In other words, motion vectors of not only a block a0 in the leftmost among blocks adjacent to an upper side of the current block, but all blocks adjacent to the upper side thereof can be used as motion vector predictors of the current block. Furthermore, motion vectors of not only a block b0 in the upper-most among blocks adjacent to a left side thereof, but all blocks adjacent to the left side thereof can be used as motion vector predictors of the current block.

Alternatively, a median value of motion vectors of adjacent blocks can be used as a motion vector predictor. For example, median(mv_a0, mv_b0, mv_c) can be used a motion vector predictor of the current block, wherein mv_a0 denotes a motion vector of the block a0, mv_b0 denotes a motion vector of the block b0, and mv_c denotes a motion vector of the block c.

Figure 11A:
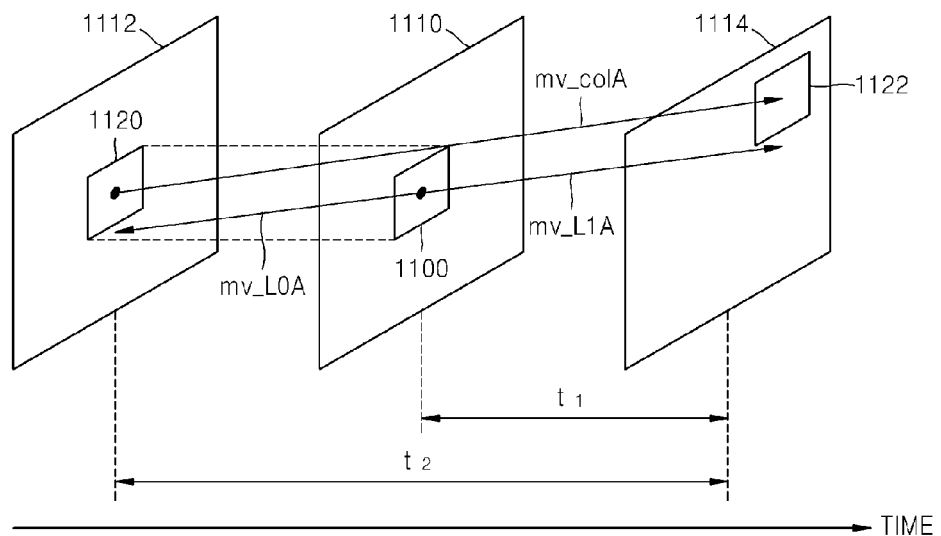
FIGS. 11A to 11C illustrate motion vector predictor candidates of an explicit mode, according to another exemplary embodiment.
Figure 11B:
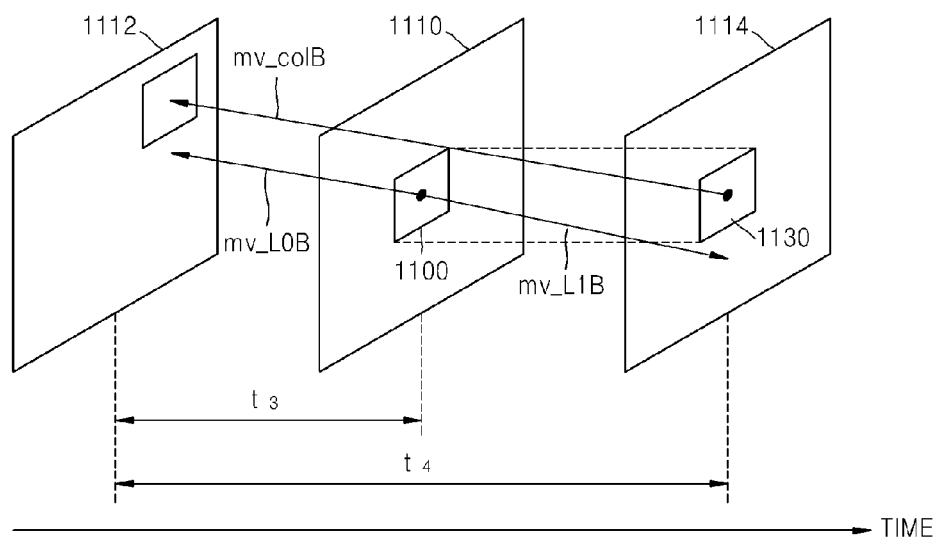
Figure 11C:
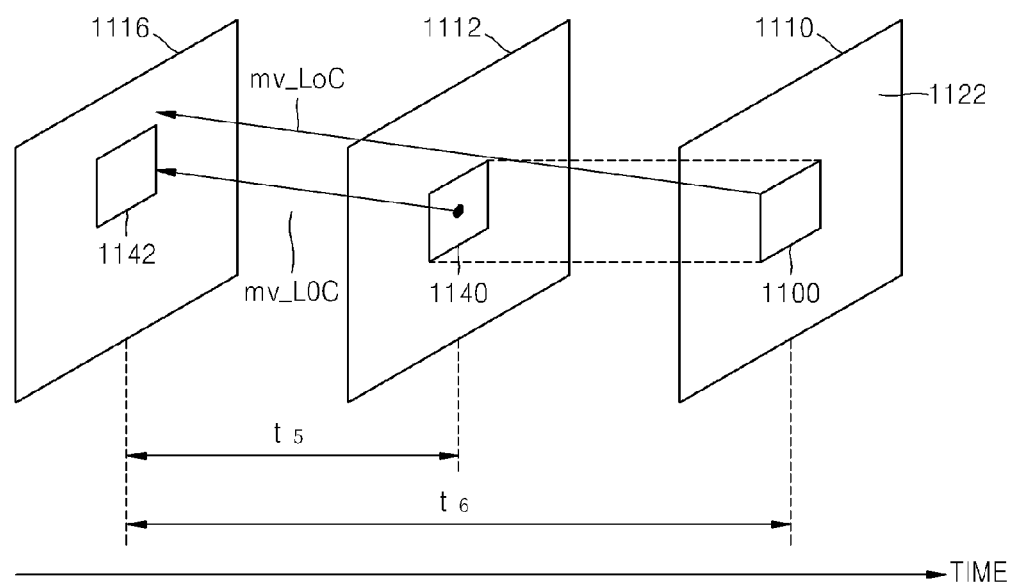

FIGS. 11A to 11C illustrate motion vector predictor candidates of an explicit mode, according to another exemplary embodiment. FIG. 11A illustrates a method of calculating a motion vector predictor of a Bi-directional Predictive Picture (referred to as a B picture), according to an exemplary embodiment. When a current picture including a current block is a B picture in which bi-directional prediction is performed, a motion vector generated based on a temporal distance may be a motion vector predictor.

Referring to FIG. 11A, a motion vector predictor of a current block 1100 of a current picture 1110 can be generated using a motion vector of a block 1120 in a co-located position of a temporally preceding picture 1112. For example, if a motion vector mv_colA of the block 1120 in a position co-located with the current block 1100 is generated for a searched block 1122 of a temporally following picture 1114 of the current picture 1110, motion vector predictor candidates mv_L0A and mv_L1A of the current block 1100 can be generated in accordance with the equations below:

$$\mathrm{mv\_L1}A = (t1/t2) \times \mathrm{mv\_col}A$$

$$\mathrm{mv\_L0}A = \mathrm{mv\_L1}A - \mathrm{mv\_col}A$$

where mv_L0A denotes a motion vector predictor of the current block 1100 for the temporally preceding picture 1112, and mv_L1A denotes a motion vector predictor of the current block 1100 for the temporally following picture 1114.

FIG. 11B illustrates a method of generating a motion vector predictor of a B picture, according to another exemplary embodiment. Compared with the method illustrated in FIG. 11A, a block 1130 in a position co-located with the current block 1100 exists in the temporally following picture 1114 in FIG. 11B.

Referring to FIG. 11B, a motion vector predictor of the current block 1100 of the current picture 1110 can be generated using a motion vector of a block 1130 in a co-located position of the temporally following picture 1114. For example, if a motion vector mv_colB of the block 1130 in a position co-located with the current block 1100 is generated for a searched block 1132 of the temporally preceding picture 1112 of the current picture 1110, motion vector predictor candidates mv_L0B and mv_L1B of the current block 1100 can be generated in accordance with the equations below:

$$mv\_L0B=(t3/t4)\times mv\_colB$$

$$mv\_L1B=mv\_L0B-mv\_colB$$

where mv_L0B denotes a motion vector predictor of the current block 1100 for the temporally preceding picture 1112, and mv_L1B denotes a motion vector predictor of the current block 1100 for the temporally following picture 1114.

In the generation of a motion vector of the current block 1100 of a B picture, at least one of the methods illustrated in FIGS. 11A and 11B can be used. In other words, since a motion vector predictor is generated using a motion vector and a temporal distance of the block 1120 or 1130 in a position co-located with the current block 1100, motion vector predictors can be generated using the methods illustrated in FIGS. 11A and 11B if motion vectors of the blocks 1120 and 1130 in the co-located position exist. Thus, the predictor 910 according to an exemplary embodiment may generate a motion vector predictor of the current block 1100 using only a block having a motion vector among the blocks 1120 and 1130 in the co-located position.

For example, when the block 1120 in a co-located position of the temporally preceding picture 1112 is encoded using intra prediction instead of inter prediction, a motion vector of the block 1120 does not exist, and thus a motion vector predictor of the current block 1100 cannot be generated using the method of generating a motion vector predictor as illustrated in FIG. 11A.

FIG. 11C illustrates a method of generating a motion vector predictor of a B picture, according to an exemplary embodiment. Referring to FIG. 11C, a motion vector predictor of the current block 1100 of the current picture 1110 can be generated using a motion vector of a block 1140 in a co-located position of the temporally preceding picture 1112. For example, if a motion vector mv_colC of the block 1130 in a position co-located with the current block 1100 is generated for a searched block 1142 of another temporally preceding picture 1116, a motion vector predictor candidate mv_L0C of the current block 1100 can be generated in accordance with the equation below:

$$mv\_L0C=(t6/t5)\times mv\_colC.$$

Since the current picture 1110 is a P picture, the number of motion vector predictors of the current block 1100 is 1, unlike FIGS. 11A and 11B.

In summary, a set C of motion vector predictor candidates according to FIGS. 10A, 10B, and 11A to 11C can be generated in accordance with the equation below:

$$C=\{median(mv\_a0, mv\_b0, mv\_c), mv\_a0, mv\_a1 \ldots, mv\_aN, mv\_b0, mv\_b1, \ldots, mv\_bN, mv\_c, mv\_d, mv\_e, mv\_temporal\}.$$

Alternatively, the set C may be generated by reducing the number of motion vector predictor candidates in accordance with the equation below:

$$C=\{median(mv\_a', mv\_b', mv\_c'), mv\_a', mv\_b', mv\_c', mv\_temporal\}.$$

Herein, mv_x denotes a motion vector of a block x, median( ) denotes a median value, and mv_temporal denotes motion vector predictor candidates generated using a temporal distance described above in association with FIGS. 11A to 11C.

In addition, mv_a' denotes a very first valid motion vector among mv_a0, mv_a1 . . . , mv_aN. For example, when a block a0 is encoded using intra prediction, a motion vector mv_a0 of the block a0 is not valid, and thus mv_a'=mv_a1, and if a motion vector of a block a1 is also not valid, mv_a'=mv_a2.

Likewise, mv_b' denotes a first valid motion vector among mv_b0, mv_b1 . . . , mv_bN, and mv_c' denotes a first valid motion vector among mv_c, mv_d, and mv_e.

The explicit mode is a mode of encoding information indicating which motion vector has been used for a motion vector predictor of a current block. For example, when a motion vector is encoded in the explicit mode, a binary number can be allocated to each of elements of the set C, i.e., motion vector predictor candidates, and if one of the candidates is used as a motion vector predictor of a current block, a corresponding binary number can be output.

It will be easily understood by those of ordinary skill in the art that other motion vector predictor candidates besides those described above in association with the explicit mode can be used.

(2) Implicit Mode

Another one of the methods of encoding a motion vector predictor, which can be selected by the predictor 910, implements a mode of encoding information indicating that a motion vector predictor of a current block is generated based on blocks or pixels included in a previously encoded area adjacent to the current block. Unlike the explicit mode, this mode is a mode of encoding information indicating generation of a motion vector predictor in the implicit mode without encoding information for specifying a motion vector predictor.

As described above, such a codec as MPEG-4 H.264/MPEG-4 AVC uses motion vectors of previously encoded blocks adjacent to a current block to predict a motion vector of the current block. That is, a median of motion vectors of previously encoded blocks adjacent to left, upper, and upper-right sides of the current block is used as a motion vector predictor of the current block. In this case, unlike the explicit mode, information for selecting one of motion vector predictor candidates may not be encoded.

In other words, if only information indicating that a motion vector predictor of a current block has been encoded in the implicit mode is encoded in an image encoding process, a median value of motion vectors of previously encoded blocks adjacent to left, upper, and upper-right sides of the current block can be used as a motion vector predictor of the current block in an image decoding process.

In addition, an image encoding method according to an exemplary embodiment provides a new implicit mode besides the method of using a median value of motion vectors of previously encoded blocks adjacent to left, upper, and upper-right sides of a current block as a motion vector predictor of the current block. This will now be described in detail with reference to FIG. 12.

Figure 12:
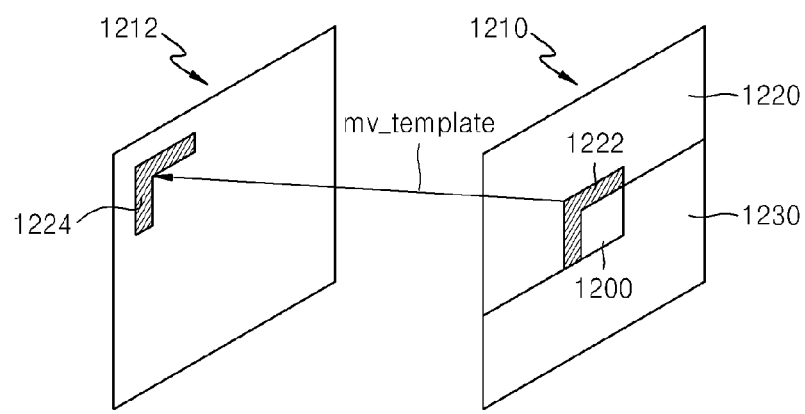
FIG. 12 illustrates a method of generating a motion vector predictor in an implicit mode, according to an exemplary embodiment.

FIG. 12 illustrates a method of generating a motion vector predictor in an implicit mode, according to an exemplary embodiment. Referring to FIG. 12, pixels 1222 included in a previously encoded area 1220 adjacent to a current block 1200 of a current picture 1210 are used to generate a motion vector predictor of the current block 1200. Corresponding pixels 1224 are determined by searching a reference picture 1212 using the adjacent pixels 1222. The corresponding pixels 1224 can be determined by calculating a Sum of Absolute Differences (SAD). When the corresponding pixels 1224 are determined, a motion vector mv_template of the adjacent pixels 1222 is generated, and the motion vector mv_template can be used as a motion vector predictor of the current block 1200.

If a mode of using a median of motion vectors of adjacent blocks as a motion vector predictor is defined as "implicit mode_1," and if a mode of generating a motion vector predictor using pixels adjacent to a current block is defined as "implicit mode_2," a motion vector predictor can be generated using one of the two implicit modes implicit mode_1 and implicit mode_2 by encoding information about one of the two implicit modes in an image encoding process and referring to the information about a mode in an image decoding process.

(3) Mode Selection

There may be various criteria for the predictor 910 to select one of the above-described explicit mode and implicit mode.

Since one of a plurality of motion vector predictor candidates is selected in the explicit mode, a motion vector predictor more similar to a motion vector of a current block can be selected. However, since information indicating one of a plurality of motion vector predictor candidates is encoded, a greater overhead than in the implicit modes may occur. Thus, for a coding unit having a great size, a motion vector may be encoded in the explicit mode because a probability of increasing an error occurring when a motion vector is wrongly predicted is higher for a coding unit having a great size than a coding unit having a small size and the number of overhead occurrence times decreases for each picture.

For example, when a picture equally divided into m coding units having a size of 64×64 is encoded in the explicit mode, the number of overhead occurrence times is m. However, when a picture, which has the same size, equally divided into 4 m coding units having the size of 32×32 is encoded in the explicit mode, the number of overhead occurrence times is 4 m.

Accordingly, the predictor 910 according to an exemplary embodiment may select one of the explicit mode and the implicit mode based on the size of a coding unit when a motion vector of a current block is encoded.

Since the size of a coding unit in the image encoding method and the image decoding method according to exemplary embodiments described above with reference to FIGS. 1 to 8 is represented using a depth, the predictor 910 determines based on a depth of a current block whether a motion vector of the current block is encoded in the explicit mode or the implicit mode. For example, when coding units whose depths are 0 and 1 are inter-predicted, motion vectors of the coding units are encoded in the explicit mode, and when coding units whose depths are equal to or greater than 2 are inter-predicted, motion vectors of the coding units are encoded in the implicit mode.

According to another exemplary embodiment, the predictor 910 may select the explicit mode or the implicit mode for each picture or slice unit. Since image characteristics are different for each picture or slice unit, the explicit mode or the implicit mode can be selected for each picture or slice unit by considering these image characteristics. Motion vectors of coding units included in a current picture or slice can be prediction-encoded by selecting an optimal mode from among the explicit mode and the implicit mode in consideration of R-D cost.

For example, if motion vectors of coding units included in a picture or slice can be exactly predicted without using the explicit mode, motion vectors of all coding units included in the picture or slice may be prediction-encoded in the implicit mode.

According to another exemplary embodiment, the predictor 910 may select the explicit mode or the implicit mode based on whether a current block has been encoded in the skip mode. The skip mode is an encoding mode in which flag information indicating that a current block has been encoded in the skip mode is encoded without encoding a pixel value.

Furthermore, the skip mode is a mode in which a pixel value of a current block is not encoded since a prediction block generated by performing motion compensation using a motion vector predictor as a motion vector of the current block is similar to the current block. Thus, as a motion vector predictor is generated more similarly to a motion vector of a current block, a probability of encoding the current block in the skip mode is higher. Accordingly, a block encoded in the skip mode can be encoded in the explicit mode.

Referring back to FIG. 9, when the predictor 910 selects one of the explicit mode and the implicit mode and determines a motion vector predictor according to the selected mode, the first encoder 920 and the second encoder 930 encode information about an encoding mode and a motion vector.

Specifically, the first encoder 920 encodes information about a motion vector predictor of a current block. In more detail, when the predictor 910 determines that a motion vector of the current block is encoded in the explicit mode, the first encoder 920 encodes information indicating that a motion vector predictor has been generated in the explicit mode and information indicating which motion vector predictor candidate has been used as the motion vector predictor of the current block.

In contrast, when the predictor 910 selects that the motion vector of the current block is encoded in the implicit mode, the first encoder 920 encodes information indicating that the motion vector predictor of the current block has been generated in the implicit mode. In other words, the first encoder 920 encodes information indicating the motion vector predictor of the current block has been generated using blocks or pixels adjacent to the current block. If two or more implicit modes are used, the first encoder 920 may further encode information indicating which implicit mode has been used to generate the motion vector predictor of the current block.

The second encoder 930 encodes a motion vector of a current block based on a motion vector predictor determined by the predictor 910. Alternatively, the second encoder 930 generates a difference vector by subtracting the motion vector predictor generated by the predictor 910 from the motion vector of the current block generated as a result of motion compensation and encodes information about the difference vector.

Figure 13:
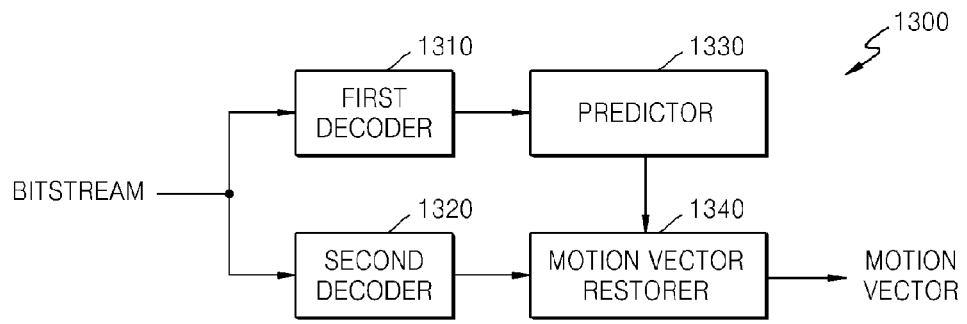
FIG. 13 is a block diagram of an apparatus for decoding a motion vector, according to an exemplary embodiment.

FIG. 13 is a block diagram of an apparatus 1300 for decoding a motion vector, according to an exemplary embodiment. The apparatus 1300 for decoding the motion vector may be included in the image decoding apparatus 200 described above with reference FIG. 2 or the image decoder 500 described above with reference to FIG. 5. Referring to FIG. 13, a motion vector decoding apparatus 1300 includes a first decoder 1310, a second decoder 1320, a predictor 1330, and a motion vector restorer 1340.

The first decoder 1310 decodes information about a motion vector predictor of a current block, which is included in a bitstream. In detail, the first decoder 1310 decodes information indicating whether the motion vector predictor of the current block has been encoded in the explicit mode or the implicit mode. When the motion vector predictor of the current block has been encoded in the explicit mode, the first decoder 1310 further decodes information indicating a motion vector predictor used as the motion vector predictor of the current block among a plurality of motion vector predictors. When the motion vector predictor of the current block has been encoded in the implicit mode, the first decoder 1310 may further decode information indicating which of a plurality of implicit modes has been used to encode the motion vector predictor of the current block.

The second decoder 1320 decodes a difference vector between a motion vector and the motion vector predictor of the current block included in the bitstream.

The predictor 1330 generates a motion vector predictor of the current block based on the information about the motion vector predictor of the current block, which has been decoded by the first decoder 1310.

When the information about the motion vector predictor of the current block, which has been encoded in the explicit mode, is decoded, the predictor 1330 generates a motion vector predictor among the motion vector predictor candidates described above with reference to FIGS. 10A, 10B, and 11A to 11C and uses the generated motion vector predictor as the motion vector predictor of the current block.

When the information about the motion vector predictor of the current block, which has been encoded in the implicit mode, is decoded, the predictor 1330 generates the motion vector predictor of the current block using blocks or pixels included in a previously encoded area adjacent to the current block. In more detail, the predictor 1330 generates a median value of motion vectors of blocks adjacent to the current block as the motion vector predictor of the current block or generates the motion vector predictor of the current block by searching a reference picture using pixels adjacent to the current block.

The motion vector restorer 1340 restores a motion vector of the current block by summing the motion vector predictor generated by the predictor 1330 and the difference vector decoded by the second decoder 1320. The restored motion vector is used for motion compensation of the current block.

Figure 14:
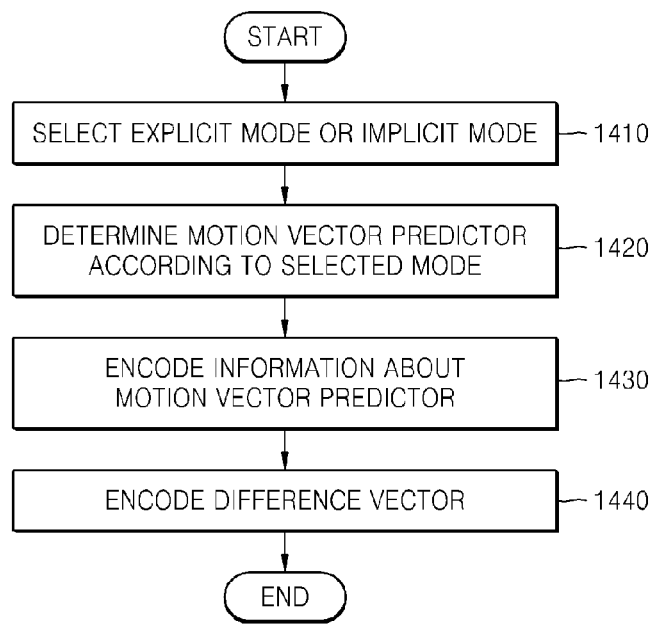
FIG. 14 is a flowchart of a method of encoding a motion vector, according to an exemplary embodiment.

FIG. 14 is a flowchart of a method of encoding a motion vector, according to an exemplary embodiment. Referring to FIG. 14, a motion vector encoding apparatus 900 according to an exemplary embodiment of selects one of an explicit mode and an implicit mode as a mode of encoding information about a motion vector predictor in operation 1410.

The explicit mode is a mode of encoding information indicating a motion vector predictor candidate among at least one motion vector predictor candidate as information about a motion vector predictor, and the implicit mode is a mode of encoding information indicating that a motion vector predictor has been generated based on blocks or pixels included in a previously encoded area adjacent to a current block as information about the motion vector predictor. Detailed descriptions thereof have been given above with reference to FIGS. 10A, 10B, 11A to 11C, and 12.

A mode may be selected based on the size of a current block, i.e., a depth of the current block, or selected in a unit of a current picture or slice in which the current block is included. Alternatively, a mode may be selected according to whether the current block has been encoded in a skip mode.

In operation 1420, the motion vector encoding apparatus 900 determines a motion vector predictor according to the mode selected in operation 1410. In detail, the motion vector encoding apparatus 900 determines a motion vector predictor of the current block based on the explicit mode or the implicit mode selected in operation 1410. In more detail, the motion vector encoding apparatus 900 determines a motion vector predictor candidate among at least one motion vector predictor candidate as the motion vector predictor of the current block in the explicit mode or determines the motion vector predictor of the current block based on blocks or pixels adjacent to the current block in the implicit mode.

In operation 1430, the motion vector encoding apparatus 900 encodes information about the motion vector predictor determined in operation 1420. In the case of the explicit mode, the motion vector encoding apparatus 900 encodes information indicating a motion vector predictor candidate among at least one motion vector predictor candidate as the motion vector predictor of the current block and information indicating that information about the motion vector predictor of the current block has been encoded in the explicit mode. In the case of the implicit mode, the motion vector encoding apparatus 900 encodes information indicating that the motion vector predictor of the current block has been generated based on blocks or pixels included in a previously encoded area adjacent to the current block. In the case of a plurality of implicit modes, the motion vector encoding apparatus 900 may further encode information indicating one of the plurality of implicit modes.

In operation 1440, the motion vector encoding apparatus 900 encodes a difference vector generated by subtracting the motion vector predictor determined in operation 1420 from a motion vector of the current block.

Figure 15:
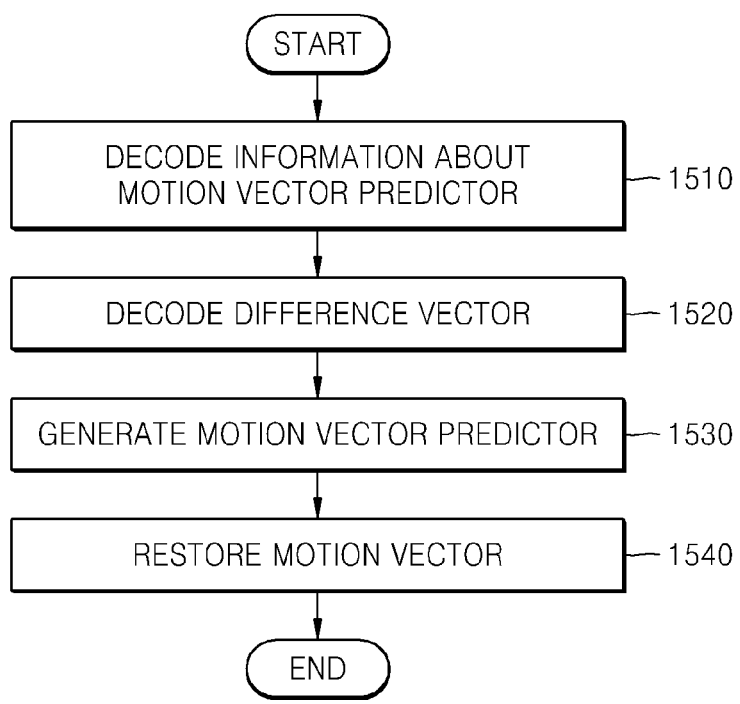
FIG. 15 is a flowchart of a method of decoding a motion vector, according to an exemplary embodiment.

FIG. 15 is a flowchart of a method of decoding a motion vector, according to an exemplary embodiment. Referring to FIG. 15, a motion vector decoding apparatus 1300 according to an exemplary embodiment decodes information about a motion vector predictor of a current block, which is included in a bitstream, in operation 1510. In detail, the motion vector decoding apparatus 1300 decodes information about a mode used to encode the motion vector predictor of the current block from among an explicit mode and an implicit mode.

In the case of the explicit mode, the motion vector decoding apparatus 1300 decodes information indicating that the motion vector predictor of the current block has been encoded in the explicit mode and information about a motion vector predictor candidate among at least one motion vector predictor candidate. In the case of the implicit mode, the motion vector decoding apparatus 1300 decodes information indicating that the motion vector predictor of the current block has been generated based on blocks or pixels included in a previously decoded area adjacent to the current block. In the case of a plurality of implicit modes, the motion vector decoding apparatus 1300 may further decode information indicating one of the plurality of implicit modes.

In operation 1520, the motion vector decoding apparatus 1300 decodes information about a difference vector. The difference vector is a vector of a difference between the motion vector predictor of the current block and a motion vector of the current block.

In operation 1530, the motion vector decoding apparatus 1300 generates the motion vector predictor of the current block based on the information about the motion vector predictor, which has been decoded in operation 1510. In detail, the motion vector decoding apparatus 1300 generates the motion vector predictor of the current block according to the explicit mode or the implicit mode. In more detail, the motion vector decoding apparatus 1300 generates the motion vector predictor of the current block by selecting a motion vector predictor candidate among at least one motion vector predictor candidate or using blocks or pixels included in a previously decoded area adjacent to the current block.

In operation 1540, the motion vector decoding apparatus 1300 restores the motion vector of the current block by summing the difference vector decoded in operation 1520 and the motion vector predictor generated in operation 1530.

While exemplary embodiments have been particularly shown and described above, it will be understood by those of ordinary skill in the art that various changes in form and details may be made therein without departing from the spirit and scope of the present inventive concept as defined by the following claims.

In addition, a system according to an exemplary embodiment can be implemented using a computer readable code in a computer readable recording medium. For example, at least one of an apparatus 100 for encoding an image, an apparatus 200 for decoding an image, an image encoder 400, an image decoder 500, a motion vector encoding apparatus 900, and a motion vector decoding apparatus 1300, according to exemplary embodiments, may include a bus coupled to units of each of the devices shown in FIGS. 1, 2, 4, 5, 9, and 13 and at least one processor connected to the bus. In addition, a memory coupled to at least one processor for performing commands as described above can be included and connected to the bus to store the commands and received messages or generated messages.

The computer readable recording medium is any data storage device that can store data which can be thereafter read by a computer system. Examples of the computer readable recording medium include read-only memory (ROM), random-access memory (RAM), CD-ROMs, magnetic tapes, floppy disks and, optical data storage devices. The computer readable recording medium can also be distributed over network coupled computer systems so that the computer readable code is stored and executed in a distributed fashion.

What is claimed is:

1. A method of decoding an image, the method comprising:
    obtaining a prediction mode information of a current block from a bitstream;
    when the prediction mode information indicates that prediction mode of the current block is inter-prediction, determining motion vector predictor candidates from among motion vectors of neighboring blocks adjacent to the current block;
    obtaining a motion vector predictor information indicating a motion vector predictor of the current block from among the motion vector predictor candidates;
    determining the motion vector predictor of the current block from among the motion vector predictor candidates based on the motion vector predictor information; and
    obtains a motion vector of the current block based on the motion vector predictor and a differential vector,
    wherein the neighboring blocks comprise at least one of a first block and a second block,
    the first block is located on a left side of a leftmost block among lower blocks adjacent to a lower side of the current block,
    the first block is located below a lowermost block among left blocks adjacent to a left side of the current block, and
    the second block is located on an upper side of the first block,
    wherein the image is hierarchically split from a plurality of maximum coding units, according to information about a maximum sire of a coding unit, into coding units of coded depths according to depths,
    wherein a coding unit of a current depth is one of rectangular data units split from a coding unit of an upper depth,
    wherein one or more prediction units are obtained from the coding unit of the current depth, and
    the current block is one of the prediction units obtained from the coding unit of the current depth.

2. An apparatus of encoding an image, the apparatus comprising:
    a predictor which determines, when a prediction mode of a current block is inter-prediction, motion vector predictor candidates from among motion vectors neighboring blocks, and determines a motion vector predictor of a current block from among the motion vector predictor candidates; and
    an entropy encoder which encoding a motion vector predictor information indicating the motion vector predictor of the current block,
    wherein the neighboring blocks comprise at least one of a first block and a second block,
    the first block is located on a the left side of a leftmost block among lower blocks adjacent to a lower side of the current block,
    the first block is located below a lowermost block among left blocks adjacent to a left side of the current block, and
    the second block is located on an upper side of the first block.

3. A method of encoding an image, the method comprising:
    determining a prediction mode of a current block;
    when the prediction mode of the current block is inter-prediction, determining motion vector predictor candidates from among motion vectors of neighboring blocks adjacent to the current block; and
    encoding a motion vector predictor information indicating the motion vector predictor of the current block,
    wherein the neighboring blocks comprise a lower left block, the lower left block located on the left of a leftmost block among lower blocks adjacent to a lower side of the current block, and the lower left block located below a lowermost block among left blocks adjacent to a left side of the current block.

4. A method of encoding an image, the method comprising: determining a prediction mode of a current prediction unit in a current coding unit hierarchically split from a maximum coding unit;
    when a prediction mode of the current prediction unit is inter-prediction mode, determining motion vector predictor candidates from among motion vectors of neighboring prediction units adjacent to the current prediction unit;
    determining a motion vector predictor of the current prediction unit from among the motion vector predictor candidates; and
    encoding a motion vector predictor information indicating the motion vector predictor of the current prediction unit,
    wherein the neighboring prediction unit comprises a first block directly to the left side of a leftmost block among blocks located directly to a bottom side of the current prediction unit.

5. A method of encoding an image, the method comprising:
    determining a prediction mode of a current prediction unit in a current coding unit hierarchically split from a maximum coding unit;

when a prediction mode of the current prediction unit is inter-prediction mode, determining motion vector predictor candidates from among motion vectors of neighboring prediction units adjacent to the current prediction unit;

determining a motion vector predictor of the current prediction unit from among the motion vector predictor candidates; and encoding a motion vector predictor information indicating the motion vector predictor of the current prediction unit, wherein the neighboring prediction units comprise a first block directly to a left side of a leftmost block among blocks located directly below a bottom side of the current prediction unit and a second block located directly above an upper side of the first block.

6. An apparatus of encoding an image, the apparatus comprising:

a predictor which determines a prediction mode of a current prediction unit in a current coding unit hierarchically split from a maximum coding unit, when a prediction mode of the current prediction unit is inter-prediction mode, determines motion vector predictor candidates from among motion vectors of neighboring prediction units adjacent to the current prediction unit, and determines a motion vector predictor of the current prediction unit from among the motion vector predictor candidates; and an entropy encoder which encoding a motion vector predictor information indicating the motion vector predictor of the current prediction unit, wherein the neighboring prediction unit comprises a first block directly to the left side of a leftmost block among blocks located directly to a bottom side of the current prediction unit.

7. A non-transitory computer-readable storage medium storing a bit stream, the bit stream comprising: a prediction mode information indicating a prediction mode applied to a current block; and a motion vector predictor information indicating a motion vector predictor of the current block, wherein the motion vector predictor candidates are determined from among motion vectors neighboring blocks, and the motion vector predictor of the current block is determined from among the motion vector predictor candidates based on the motion vector predictor information, wherein the neighboring blocks comprise at least one of a first block and a second block, the first block is located on a the left side of a leftmost block among lower blocks adjacent to a lower side of the current block, the first block is located below a lowermost block among left blocks adjacent to a left side of the current block, and the second block is located on an upper side of the first block.

8. A non-transitory computer-readable storage medium storing a bit stream, the bit stream comprising: a prediction mode information indicating a prediction mode applied to a current block; and a motion vector predictor information indicating a motion vector predictor of the current block, wherein the motion vector predictor candidates are determined from among motion vectors neighboring blocks, and the motion vector predictor of the current block is determined from among the motion vector predictor candidates based on the motion vector predictor information, wherein the neighboring blocks comprise a lower left block, the lower left block located on the left of a leftmost block among lower blocks adjacent to a lower side of the current block, and the lower left block located below a lowermost block among left blocks adjacent to a left side of the current block.

9. A non-transitory computer-readable storage medium storing a bit stream, the bit stream comprising: a prediction mode information indicating a prediction mode applied to a current block; and a motion vector predictor information indicating a motion vector predictor of the current block, wherein the motion vector predictor candidates are determined from among motion vectors neighboring blocks, and the motion vector predictor of the current block is determined from among the motion vector predictor candidates based on the motion vector predictor information, wherein the neighboring blocks comprise a lower left block, the lower left block located on the left of a leftmost block among lower blocks adjacent to a lower side of the current block, and the lower left block located below a lowermost block among left blocks adjacent to a left side of the current block, the neighboring prediction unit comprises a first block directly to the left side of a leftmost block among blocks located directly to a bottom side of the current prediction unit.

10. A non-transitory computer-readable storage medium storing a bit stream, the bit stream comprising: a prediction mode information indicating a prediction mode applied to a current block; and a motion vector predictor information indicating a motion vector predictor of the current block, wherein the motion vector predictor candidates are determined from among motion vectors neighboring blocks, and the motion vector predictor of the current block is determined from among the motion vector predictor candidates based on the motion vector predictor information, wherein the neighboring blocks comprise a lower left block, the lower left block located on the left of a leftmost block among lower blocks adjacent to a lower side of the current block, and the lower left block located below a lowermost block among left blocks adjacent to a left side of the current block, wherein the neighboring prediction units comprise a first block directly to a left side of a leftmost block among blocks located directly below a bottom side of the current prediction unit and a second block located directly above an upper side of the first block.

11. A non-transitory computer-readable storage medium storing a bit stream, the bit stream comprising: a prediction mode information indicating a prediction mode of a current prediction unit in a current coding unit hierarchically split from a maximum coding unit; and a motion vector predictor information indicating a motion vector predictor of the current prediction unit, wherein the motion vector predictor candidates are determined from among motion vectors neighboring prediction units, and the motion vector predictor of the current prediction unit is determined from among the motion vector predictor candidates based on the motion vector predictor information, wherein the neighboring prediction units comprise a first block directly to a left side of a leftmost block among blocks located directly below a bottom side of the current prediction unit and a second block located directly above an upper side of the first block.

\* \* \* \* \*